(12) United States Patent
Tanaka

(10) Patent No.: US 11,256,064 B2
(45) Date of Patent: Feb. 22, 2022

(54) FOCUSING CONTROL DEVICE, LENS DEVICE, IMAGING DEVICE, FOCUSING CONTROL METHOD, FOCUSING CONTROL PROGRAM

(71) Applicant: FUJIFILM Corporation, Tokyo (JP)

(72) Inventor: Koichi Tanaka, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 706 days.

(21) Appl. No.: 16/151,358

(22) Filed: Oct. 4, 2018

(65) Prior Publication Data

US 2019/0041604 A1    Feb. 7, 2019

Related U.S. Application Data

(63) Continuation of application No. PCT/JP2017/011240, filed on Mar. 21, 2017.

(30) Foreign Application Priority Data

Apr. 7, 2016   (JP) .............. JP2016-077550

(51) Int. Cl.
   *G02B 7/34*   (2021.01)
   *G02B 7/28*   (2021.01)
   (Continued)

(52) U.S. Cl.
   CPC ............. *G02B 7/34* (2013.01); *G02B 7/09* (2013.01); *G02B 7/28* (2013.01);
   (Continued)

(58) Field of Classification Search
   CPC .............. G08C 17/02; G08C 2201/51; H02J 13/00009; H02J 3/00; H04L 47/781;
   (Continued)

(56) References Cited

U.S. PATENT DOCUMENTS

2008/0112643 A1*   5/2008   Kusaka .............. H04N 9/04557
                                                     382/278
2009/0080876 A1    3/2009   Brusnitsyn et al.
                       (Continued)

FOREIGN PATENT DOCUMENTS

CN    103238098    8/2013
CN    105474064    4/2016
             (Continued)

OTHER PUBLICATIONS

"Office Action of China Counterpart Application", dated Nov. 24, 2020, with English translation thereof, p. 1-p. 6.
(Continued)

*Primary Examiner* — Joseph P Martinez
*Assistant Examiner* — Vipin Patel
(74) *Attorney, Agent, or Firm* — JCIPRNET

(57) ABSTRACT

A focusing control device includes: a sensor that has a pair of a first signal detection unit that receives one of a pair of beams passed through different parts disposed in one direction in a pupil region of an imaging optical system including a focus lens and detects a signal depending on an intensity of received light and a second signal detection unit that receives other of the pair of beams and detects a signal depending on an intensity of received light, in which a plurality of the pairs that are arranged in the one direction form a pair line and a plurality of the pair lines are arranged in a direction orthogonal to the one direction; an addition correlation operation unit as defined herein; a non-addition correlation operation unit as defined herein; a selection unit as defined herein; and a lens driving section as defined herein.

20 Claims, 16 Drawing Sheets

(51) Int. Cl.
  *H04N 5/232*   (2006.01)
  *H04N 5/369*   (2011.01)
  *G02B 7/09*    (2021.01)
  *G03B 13/36*   (2021.01)

(52) U.S. Cl.
  CPC ... *H04N 5/232122* (2018.08); *H04N 5/36961* (2018.08); *G03B 13/36* (2013.01)

(58) Field of Classification Search
  CPC ....... H04L 47/805; Y02B 90/20; Y02E 60/00; Y02E 60/7815; Y04S 40/00; Y04S 40/121; G02B 7/09; G02B 7/28; G02B 7/34; G03B 13/36; H04N 5/232122; H04N 5/36961
  See application file for complete search history.

(56) References Cited

U.S. PATENT DOCUMENTS

| | | |
|---|---|---|
| 2013/0250164 A1 | 9/2013 | Aoki |
| 2014/0146197 A1 | 5/2014 | Okuzawa et al. |
| 2014/0211059 A1 | 7/2014 | Aoki |
| 2016/0156836 A1 | 6/2016 | Aoki |
| 2016/0327771 A1 | 11/2016 | Inoue et al. |
| 2016/0344922 A1 | 11/2016 | Aoki et al. |

FOREIGN PATENT DOCUMENTS

| | | |
|---|---|---|
| JP | 2006145862 | 6/2006 |
| JP | 2010152161 | 7/2010 |
| JP | 2012103285 | 5/2012 |
| WO | 2012073727 | 6/2012 |
| WO | 2013047160 | 4/2013 |
| WO | 2015122061 | 8/2015 |
| WO | 2015141084 | 9/2015 |

OTHER PUBLICATIONS

"Office Action of China Counterpart Application", dated May 8, 2020, with English translation thereof, p. 1-p. 11.

"Written Opinion of the International Searching Authority (Form PCT/ISA/237) of PCT/JP2017/011240," dated Jun. 20, 2017, with English translation thereof, pp. 1-7.

"International Search Report (Form PCT/ISA/210) of PCT/JP2017/011240," dated Jun. 20, 2017, with English translation thereof, pp. 1-5.

* cited by examiner

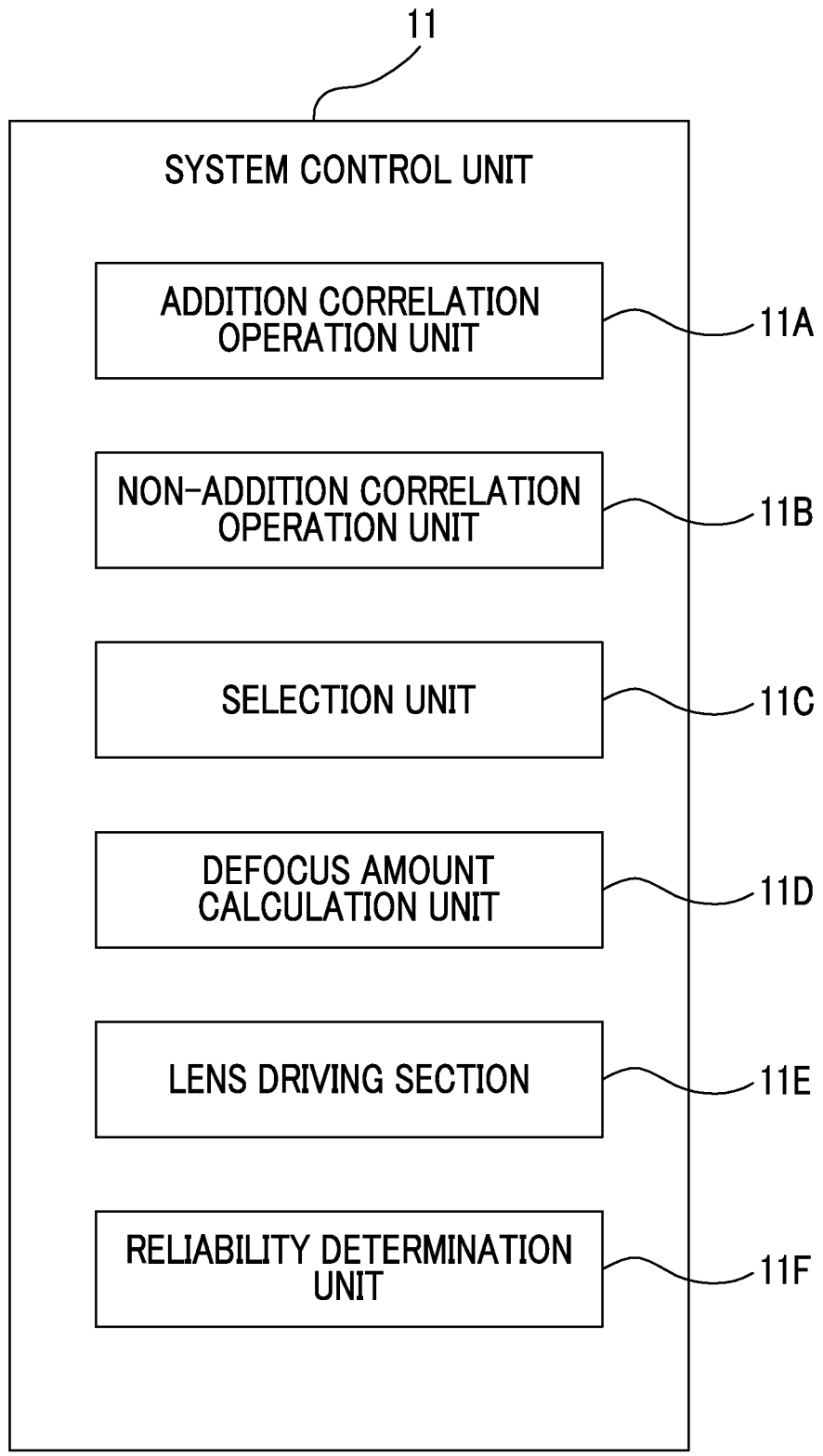

FOCUSING CONTROL DEVICE, LENS DEVICE, IMAGING DEVICE, FOCUSING CONTROL METHOD, FOCUSING CONTROL PROGRAM

CROSS REFERENCE TO RELATED APPLICATION

This is a continuation of International Application No. PCT/JP2017/011240 filed on Mar. 21, 2017, and claims priority from Japanese Patent Application No. 2016-077550 filed on Apr. 7, 2016, the entire disclosures of which are incorporated herein by reference.

BACKGROUND OF THE INVENTION

1. Field of the Invention

The present invention relates to a focusing control device, a lens device, an imaging device, a focusing control method, and a computer readable medium storing a focusing control program.

2. Description of the Related Art

According to the increase in resolution of an imaging element such as a charge coupled device (CCD) image sensor or a complementary metal oxide semiconductor (CMOS) image sensor, the demand for information devices having an imaging function, such as a digital still camera, a digital video camera, a mobile phone including a smart phone, has rapidly increased. Such an information device having the above-mentioned imaging function is referred to as an imaging device.

In such an imaging device, as a focusing control method for focusing on a main subject, phase difference auto-focus (AF) methods (see JP2010-152161A and WO2012-073727A) are employed.

JP2010-152161A and WO2012-073727A disclose an imaging device that includes an imaging element in which plural phase difference detection pixel pairs are provided and plural pair lines are arranged in a vertical direction, in which each pair line has plural pairs disposed in a horizontal direction.

The imaging device disclosed in JP2010-152161A selectively executes, on the basis of the brightness of a subject, a method for calculating a phase difference on the basis of a signal obtained by adding up detection signals of phase difference detection pixels in the plural pair lines and calculating a defocus amount on the basis of the phase difference and a method for calculating a defocus amount using an average phase difference calculated by averaging phase differences calculated for respective pair lines.

The imaging device disclosed in WO2012-073727A divides a light-receiving surface of an imaging element into plural blocks in a vertical direction, performs a correlation operation on the basis of a signal obtained by adding up detection signals of plural pair lines in each block, and calculates a defocus amount on the basis of a result of the correlation operation for each block.

SUMMARY OF THE INVENTION

As disclosed in JP2010-152161A and WO2012-073727A, by adding up detection signals of plural phase difference detection pixels and calculating a phase difference using a detection signal obtained by the addition, it is possible to reduce noise, to thereby calculate the phase difference with high accuracy.

However, there is a case where contrast is lowered as detection signals are added up, and thus, detection accuracy of a phase difference is lowered, according to a subject to be focused. For example, in the case of a subject formed of a tilted line, a fine pattern, or the like, there is a possibility that detection accuracy of a phase difference is lowered as detection signals are added up.

In the imaging device disclosed in JP2010-152161A, a method for adding up detection signals and calculating a phase difference and a method for calculating phase differences without adding up detection signals and calculating an average of plural phase differences in accordance with the brightness of a subject are selectively performed. However, with the brightness of the subject, it is difficult to distinctly identify the subject formed of the tilted line, the fine pattern or the like as described above. Thus, it is difficult to sufficiently enhance calculation accuracy of a phase difference.

In the imaging device disclosed in WO2012-073727, since addition of detection signals is premised, it is difficult to flexibly change a phase difference calculation method in accordance with subjects.

In order to solve the above-mentioned problems, an object of the invention is to provide a focusing control device, a lens device, an imaging device, a focusing control method, and a focusing control program capable of enhancing accuracy of a focusing control by calculating a phase difference suitable for a subject.

According to an aspect of the invention, there is provided a focusing control device comprising: a sensor that has a pair of a first signal detection unit that receives one of a pair of beams passed through different parts disposed in one direction in a pupil region of an imaging optical system including a focus lens and detects a signal depending on an intensity of received light and a second signal detection unit that receives the other of the pair of beams and detects a signal depending on an intensity of received light, in which a plurality of the pairs that are arranged in the one direction form a pair line and a plurality of the pair lines are arranged in a direction orthogonal to the one direction; an addition correlation operation unit that performs a correlation operation between a first signal group obtained by adding up detection signals detected by the first signal detection units of which positions in the one direction are the same, included in the plurality of pair lines, and a second signal group obtained by adding up detection signals detected by the second signal detection units of which positions in the one direction are the same, included in the plurality of pair lines; a non-addition correlation operation unit that performs, for each of the plurality of pair lines, a correlation operation between a detection signal group detected by the first signal detection units included in the pair line and a detection signal group detected by the second signal detection units included in the pair line; a selection unit that calculates a matching rate between first result information of the correlation operation performed by the addition correlation operation unit and second result information of the correlation operation performed by the non-addition correlation operation unit, and selects any one of the first result information or the second result information on the basis of the matching rate; and a lens driving section that drives the focus lens on the basis of the result information selected by the selection unit.

According to another aspect of the invention, there is provided a lens device comprising: the focusing control device; and the imaging optical system.

According to still another aspect of the invention, there is provided an imaging device comprising: an imaging element 5 that images a subject through the imaging optical system including the focus lens; and the focusing control device.

According to still another aspect of the invention, there is provided a focusing control method for controlling a position of a focus lens, using a sensor that has a pair of a first signal detection unit that receives one of a pair of beams passed through different parts disposed in one direction in a pupil region of an imaging optical system including the focus lens and detects a signal depending on an intensity of received light and a second signal detection unit that receives the other of the pair of beams and detects a signal depending on an intensity of received light, in which a plurality of the pairs that are arranged in the one direction form a pair line and a plurality of the pair lines are arranged in a direction orthogonal to the one direction, the method comprising: an addition correlation operation step of performing a correlation operation between a first signal group obtained by adding up detection signals detected by the first signal detection units of which positions in the one direction are the same, included in the plurality of pair lines, and a second signal group obtained by adding up detection signals detected by the second signal detection units of which positions in the one direction are the same, included in the plurality of pair lines; a non-addition correlation operation step of performing, for each of the plurality of pair lines, a correlation operation between a detection signal group detected by the first signal detection units included in the pair line and a detection signal group detected by the second signal detection units included in the pair line; a selection step of calculating a matching rate between first result information of the correlation operation performed in the addition correlation operation step and second result information of the correlation operation performed in the non-addition correlation operation step, and selecting any one of the first result information or the second result information on the basis of the matching rate; and a lens drive step of driving the focus lens on the basis of the result information selected in the selection step.

According to still another aspect of the invention, there is provided a focusing control program that causes a computer to execute a focusing control method for controlling a position of a focus lens, using a sensor that has a pair of a first signal detection unit that receives one of a pair of beams passed through different parts disposed in one direction in a pupil region of an imaging optical system including the focus lens and detects a signal depending on an intensity of received light and a second signal detection unit that receives the other of the pair of beams and detects a signal depending on an intensity of received light, in which a plurality of the pairs that are arranged in the one direction form a pair line and a plurality of the pair lines are arranged in a direction orthogonal to the one direction, the method comprising: an addition correlation operation step of performing a correlation operation between a first signal group obtained by adding up detection signals detected by the first signal detection units of which positions in the one direction are the same, included in the plurality of pair lines, and a second signal group obtained by adding up detection signals detected by the second signal detection units of which positions in the one direction are the same, included in the plurality of pair lines; a non-addition correlation operation step of performing, for each of the plurality of pair lines, a correlation operation between a detection signal group detected by the first signal detection units included in the pair line and a detection signal group detected by the second signal detection units included in the pair line; a selection step of calculating a matching rate between first result information of the correlation operation performed in the addition correlation operation step and second result information of the correlation operation performed in the non-addition correlation operation step, and selecting any one of the first result information or the second result information on the basis of the matching rate; and a lens drive step of driving the focus lens on the basis of the result information selected in the selection step.

According to the invention, it is possible to provide a focusing control device, a lens device, an imaging device, a focusing control method, and a focusing control program capable of calculating a phase difference suitable for a subject to enhance the accuracy of a focusing control.

BRIEF DESCRIPTION OF THE DRAWINGS

FIG. 11 is a diagram showing a modification example of functional blocks of the system control unit 11 shown in FIG. 7.

EXPLANATION OF REFERENCES

Figure 1:
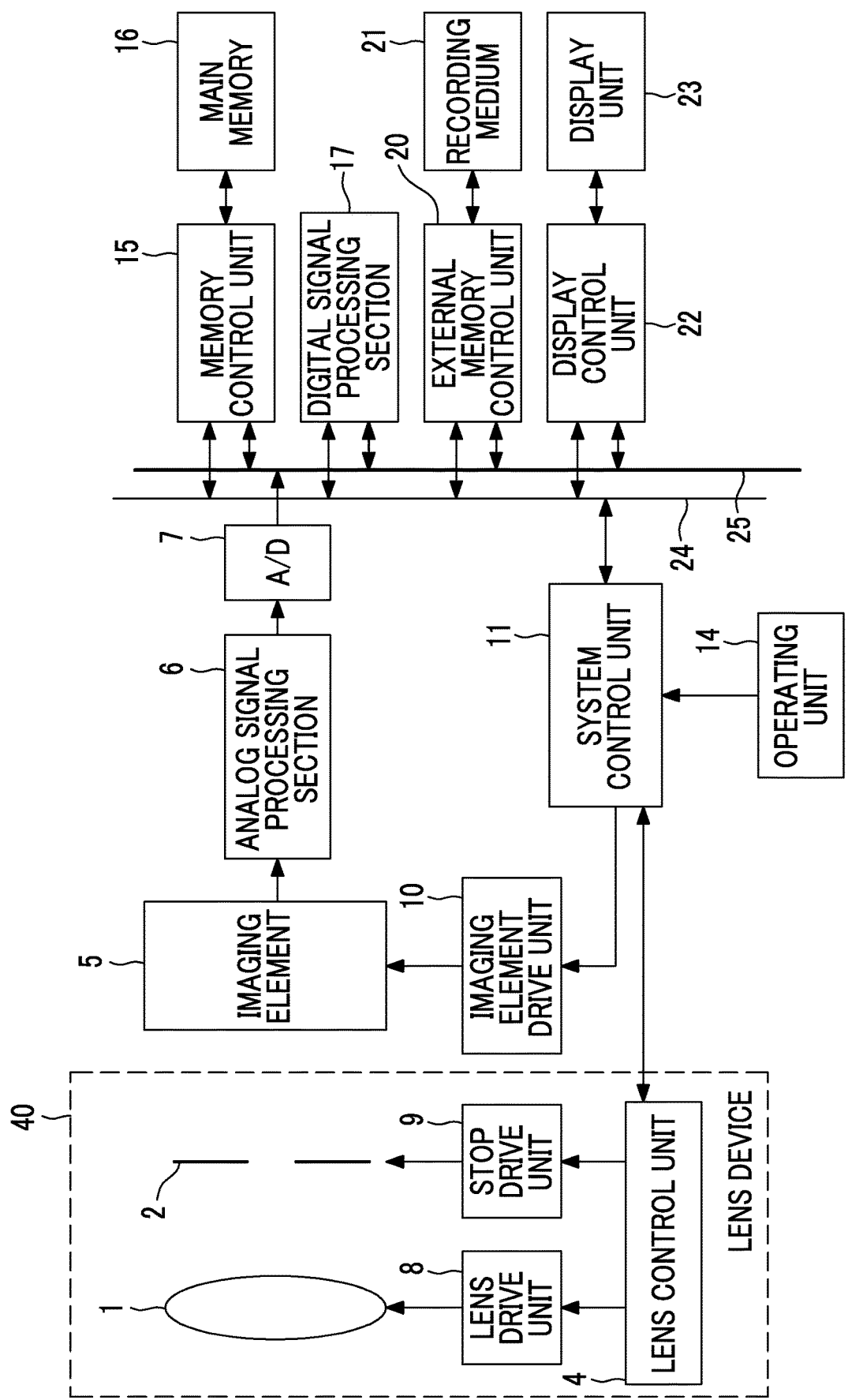
FIG. 1 is a diagram showing a schematic configuration of a digital camera that is an example of an imaging device according to an embodiment of the invention.

40: lens device
1: imaging lens
8: lens driving section
2: stop
9: stop driving section
4: lens control unit
5: imaging element
X: row direction
Y: column direction
53: AF area
50: light-receiving surface
51: pixel
52A, 52B: phase difference detection pixel
PL1, PL2, PL3: pair line
c: opening
6: analog signal processing section
7: analog digital conversion circuit
10: imaging element driving section
11: system control unit
11A: addition correlation operation unit
11B: non-addition correlation operation unit
11C: selection unit
11D: defocus amount calculation unit
11E: lens driving section
11F: reliability determination unit
14: operation unit
15: memory control unit
16: main memory
17: digital signal processing section
20: external memory control unit
21: recording medium
22: display control unit
23: display unit
24: control bus
25: data bus
$C_{S1}$, $C_{S2}$, C1, C2, C3, C4: correlation curve
80: range
100: lens device
111: focus lens
112, 113: zoom lens
114: stop
115: master lens group
116: beam splitter
116a: reflecting surface
117: mirror
118: condenser lens
119: separator lens
19R, 19L: lens
120: imaging element
121: AF unit
300: camera device
310: imaging element
320: image processing section
200: smart phone
201: housing
202: display panel
203: operation panel
204: display input unit
205: speaker
206: microphone
207: operation unit
208: camera unit
210: wireless communication unit
211: communication unit
212: storage unit
213: external input/output unit
214: GPS receiving unit
215: motion sensor unit
216: power source unit
217: internal storage section
218: external storage section
220: main control unit
ST1 to STn: GPS satellite

DESCRIPTION OF THE PREFERRED EMBODIMENTS

Hereinafter, embodiments of the invention will be described with reference to the accompanying drawings.

FIG. 1 is a diagram showing a schematic configuration of a digital camera that is an example of an imaging device according to an embodiment of the invention.

The digital camera shown in FIG. 1 includes a lens device 40 that includes an imaging lens 1, a stop 2, a lens control unit 4, a lens driving section 8, and a stop driving section 9. In this embodiment, the lens device 40 may be detachably provided with respect to a digital camera main body, or may be fixed to the digital camera main body.

The imaging lens 1 and the stop 2 form an imaging optical system, and the imaging optical system at least includes a focus lens. The focus lens is a lens for adjusting a focusing position of the imaging optical system, and is configured of a single lens or plural lenses. As the focus lens is moved in an optical axis direction of the imaging optical system, the focusing position is adjusted.

The lens control unit 4 of the lens device 40 is configured to be communicable with a system control unit 11 of the digital camera main body in a wired or wireless manner. The lens control unit 4 drives the focus lens included in the imaging lens 1 through the lens driving section 8, or drives the stop 2 through the stop driving section 9, in accordance with a command from the system control unit 11.

The digital camera main body includes an imaging element 5 such as a CCD image sensor or a CMOS image sensor that images a subject through the imaging optical system, an analog signal processing section 6 that is connected to an output end of the imaging element 5 and performs analog signal processing such as correlative double sampling processing, and an analog digital conversion circuit 7 that converts an analog signal output from the analog signal processing section 6 into a digital signal, the system control unit 11, and an operation unit 14. The analog signal processing section 6 and the analog digital conversion circuit 7 are controlled by the system control unit 11.

The system control unit 11 that generally controls the entirety of an electric control system of the digital camera drives the imaging element 5 through the imaging element driving section 10, and outputs a subject image obtained through the lens device 40 as a captured image signal. A command signal from a user is input to the system control unit 11 through the operation unit 14.

The system control unit 11 is configured of a processor and a memory such as a random access memory (RAM) and a read only memory (ROM). The system control unit 11 executes programs including a focusing control program stored in the ROM that is provided therein, to thereby realize respective functions to be described later. The system control unit 11 forms a focusing control device.

Further, an electric control system of the digital camera includes a main memory 16, a memory control unit 15 connected to the main memory 16, a digital signal processing section 17 that performs signal processing with respect to a captured image signal output from the analog digital conversion circuit 7 to generate captured image data, an external memory control unit 20 to which an attachable and detachable recording medium 21 is connected, and a display control unit 22 to which a display unit 23 mounted on a rear surface or the like of the camera is connected.

The memory control unit 15, the digital signal processing section 17, the external memory control unit 20, and the display control unit 22 are connected to each other through a control bus 24 and a data bus 25, and are controlled by commands from the system control unit 11.

Figure 2:
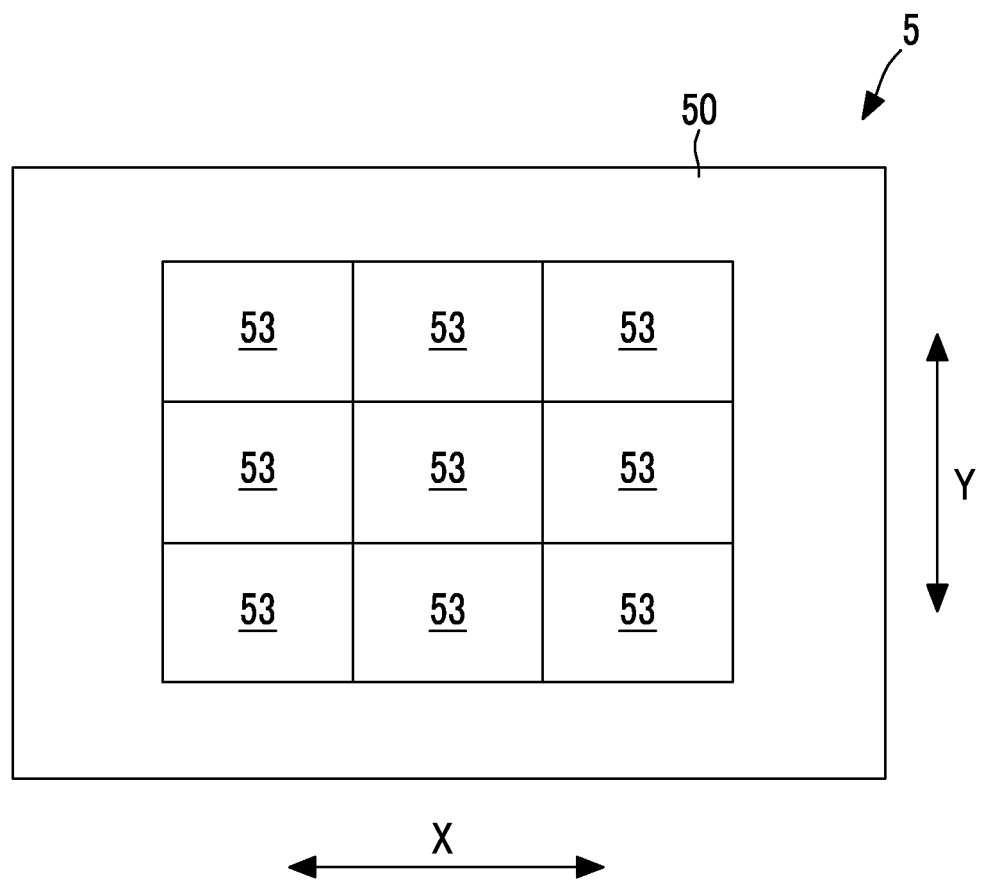
FIG. 2 is a schematic plan view showing a configuration of an imaging element 5 mounted on the digital camera shown in FIG. 1.

FIG. 2 is a schematic plan view illustrating a configuration of the imaging element 5 mounted on the digital camera shown in FIG. 1.

The imaging element 5 includes a light-receiving surface 50 on which multiple pixels are arranged in a two-dimensional pattern in a row direction X that is one direction and a column direction Y that is a direction orthogonal to the row direction X. On the light-receiving surface 50, nine focus detection areas (hereinafter, referred to as an AF area) 53 that are target areas to be focused are provided in the example of FIG. 2. In the digital camera shown in FIG. 1, one or more areas are selected from the nine AF areas 53 shown in FIG. 2, and then, the phase difference of the subject imaged in the selected AF area 53 is calculated.

The AF area 53 is an area that includes an imaging pixel and a phase difference detection pixel as pixels.

On the light-receiving surface 50, in a portion where the AF areas 53 are excluded, only imaging pixels are disposed. The AF areas 53 may be provided on the light-receiving surface 50 without a gap.

Figure 3:
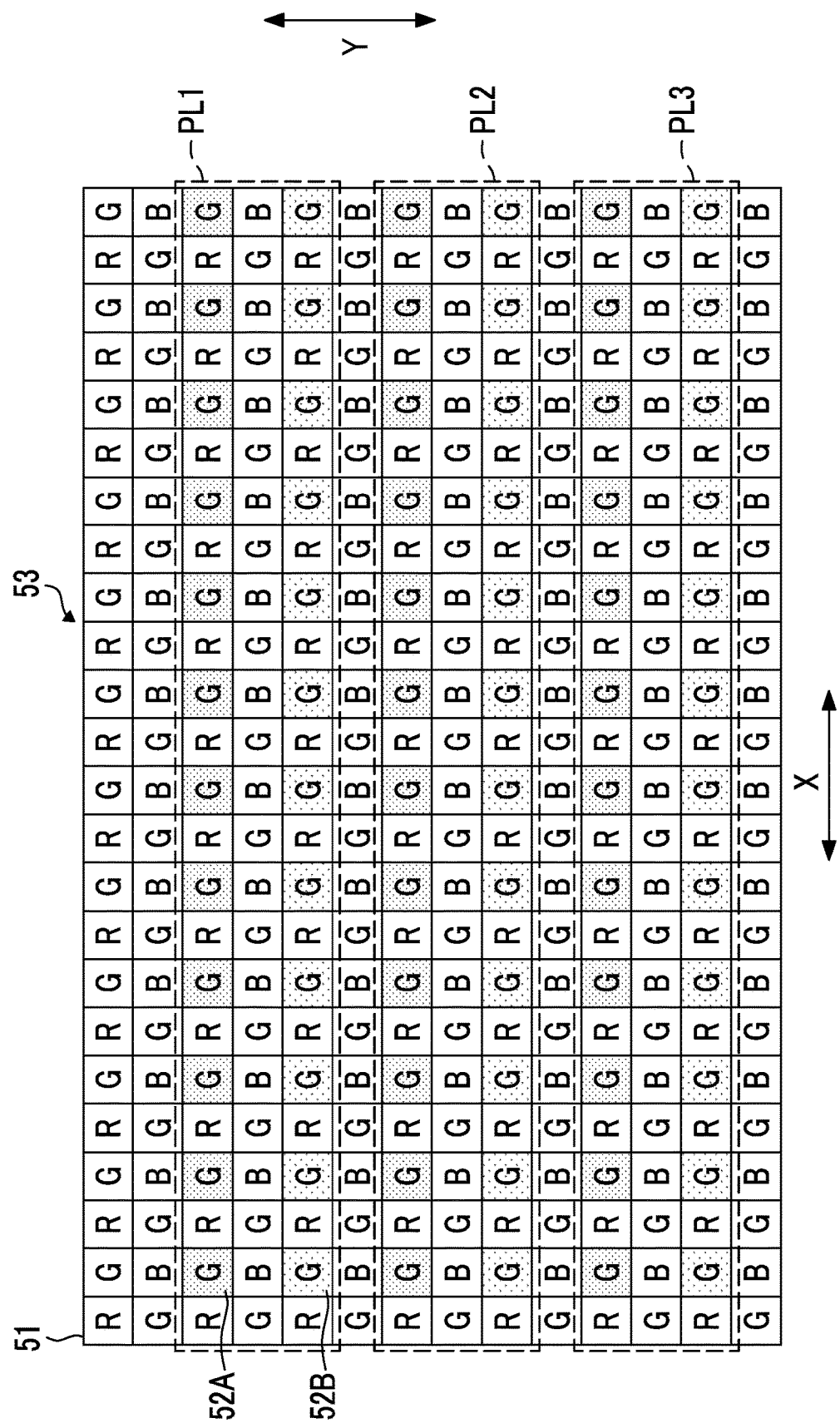
FIG. 3 is a partially enlarged view showing a single AF area 53 shown in FIG. 2.

FIG. 3 is a partially enlarged view showing a single AF area 53 shown in FIG. 2.

Pixels 51 (square shaped blocks in the figure) are arranged in the AF area 53 in a two-dimensional pattern. Each pixel 51 includes a photoelectric conversion unit such as a photo diode, and a color filter formed above the photoelectric conversion unit.

In FIG. 3, letter "R" is given to a pixel 51 (R pixel 51) including a color filter (R filter) that transmits red light.

Letter "G" is given to a pixel 51 (G pixel 51) including a color filter (G filter) that transmits green light.

Letter "B" is given to a pixel 51 (B pixel 51) including a color filter (B filter) that transmits blue light. The color filters are arranged in the form of a Bayer array over the entirety of the light-receiving surface 50.

In the AF area 53, a part of the G pixels 51 (shaded pixels in FIG. 3) are used as the phase difference detection pixels 52A and 52B. In the example of FIG. 3, each G pixel 51 in a certain pixel row among pixel rows including the R pixels 51 and the G pixels 51 is used as the phase difference detection pixel 52A. Further, the G pixel 51 of the same color closest to each G pixel 51 in the column direction Y is used as the phase difference detection pixel 52B.

The phase difference detection pixel 52A and the phase difference detection pixel 52B of the same color closest to the phase difference detection pixel 52A in the column direction Y form a pair.

A pair line PL1 is formed by plural pairs that are arranged in the row direction X by the phase difference detection pixels 52A disposed in the third pixel row from the top of FIG. 3 and the phase difference detection pixels 52B disposed in the fifth pixel row from the top of FIG. 3.

A pair line PL2 is formed by plural pairs that are arranged in the row direction X by the phase difference detection pixels 52A disposed in the seventh pixel row from the top of FIG. 3 and the phase difference detection pixels 52B disposed in the ninth pixel row from the top of FIG. 3.

A pair line PL3 is formed by plural pairs that are arranged in the row direction X by the phase difference detection pixels 52A disposed in the eleventh pixel row from the top of FIG. 3 and the phase difference detection pixels 52B disposed in the thirteenth pixel row from the top of FIG. 3.

In this way, in the AF area 53, plural pair lines are arranged in the column direction Y.

Figure 4:
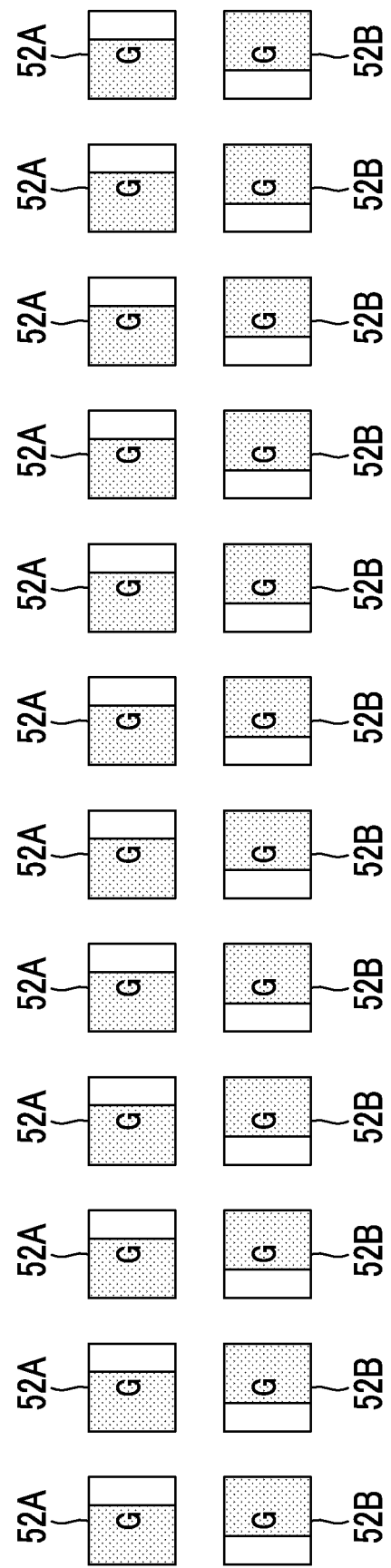
FIG. 4 is a diagram showing phase difference detection pixels that form a certain pair line shown in FIG. 3.

FIG. 4 is a diagram showing phase difference detection pixels that form a certain pair line shown in FIG. 3.

The phase difference detection pixel 52A is a first signal detection unit that receives a beam that passes through one divided region in a pupil region of the imaging lens 1, divided in the row direction X, and detects a signal depending on the intensity of received light.

The phase difference detection pixel 52B is a second signal detection unit that receives a beam that passes through the other divided region in the pupil region of the imaging lens 1 and detects a signal depending on the intensity of received light.

In the AF area 53, plural pixels 51 other than the phase difference detection pixels 52A and 52B are imaging pixels. Each imaging pixel receives beams that pass through the two divided regions in the pupil region of the imaging lens 1, and detects a signal depending on the intensity of received light.

A light shielding film is provided above the photoelectric conversion unit of each pixel 51, and an opening for defining a light-receiving area of the photoelectric conversion unit is formed in the light shielding film.

The center of the opening of the imaging pixel 51 matches the center of the photoelectric conversion unit of the imaging pixel 51. On the other hand, the center of the opening (white portion in FIG. 4) of the phase difference detection pixel 52A is eccentric rightward with respect to the center of the photoelectric conversion unit of the phase difference detection pixel 52A.

Further, the center of the opening (white portion in FIG. 4) of the phase difference detection pixel 52B is eccentric leftward with respect to the center of the photoelectric conversion unit of the phase difference detection pixel 52B. Here, the right direction represents one direction along the row direction X shown in FIG. 3, and the left direction represents the other direction along the row direction X.

Figure 5:
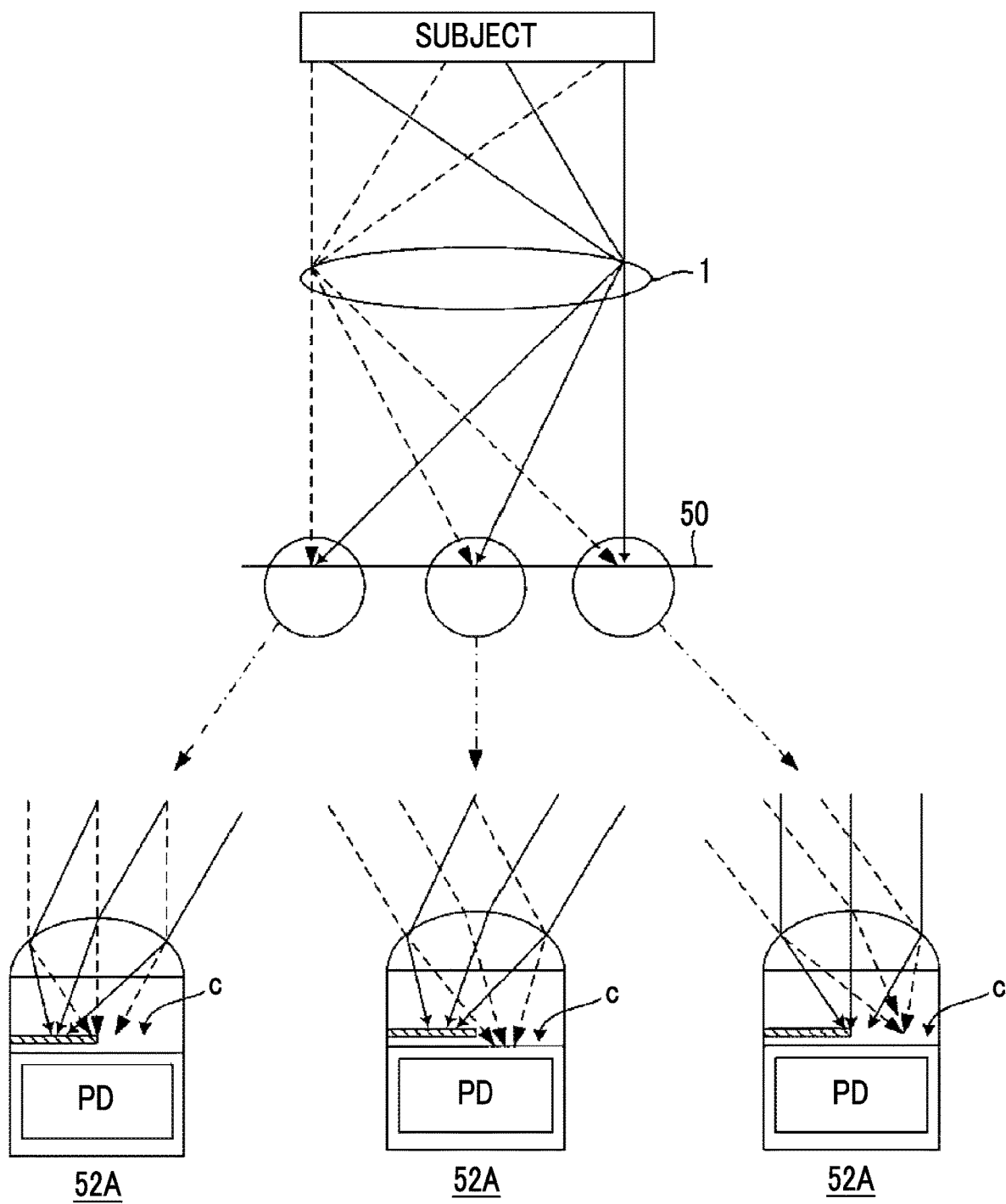
FIG. 5 is a diagram showing a configuration of cross-sections of phase difference detection pixels 52A.

FIG. 5 is a diagram showing a configuration of cross-sections of the phase difference detection pixels 52A. As shown in FIG. 5, an opening c of the phase difference detection pixel 52A is eccentric rightward with respect to the photoelectric conversion unit (PD).

As shown in FIG. 5, by covering one side of the photoelectric conversion unit by the light shielding film, it is possible to selectively shield light incident in a direction opposite to a side where the photoelectric conversion unit is covered by the light shielding film.

With such a configuration, it is possible to detect, using a pixel group that includes the phase difference detection pixels 52A that form a pair line and a pixel group that includes the phase difference detection pixels 52B that form the pair line, a phase difference in the row direction X in images respectively captured by the two pixel groups.

The pixel configuration of the imaging element 5 is not limited to the configuration shown in FIGS. 2 to 5.

For example, a configuration in which all pixels included in the imaging element 5 are used as imaging pixels 51 and each imaging pixel 51 is divided into two parts, in which one divided part is used as a phase difference detection pixel 52A and the other divided part is used as a phase difference detection pixel 52B, may be used.

Figure 6:
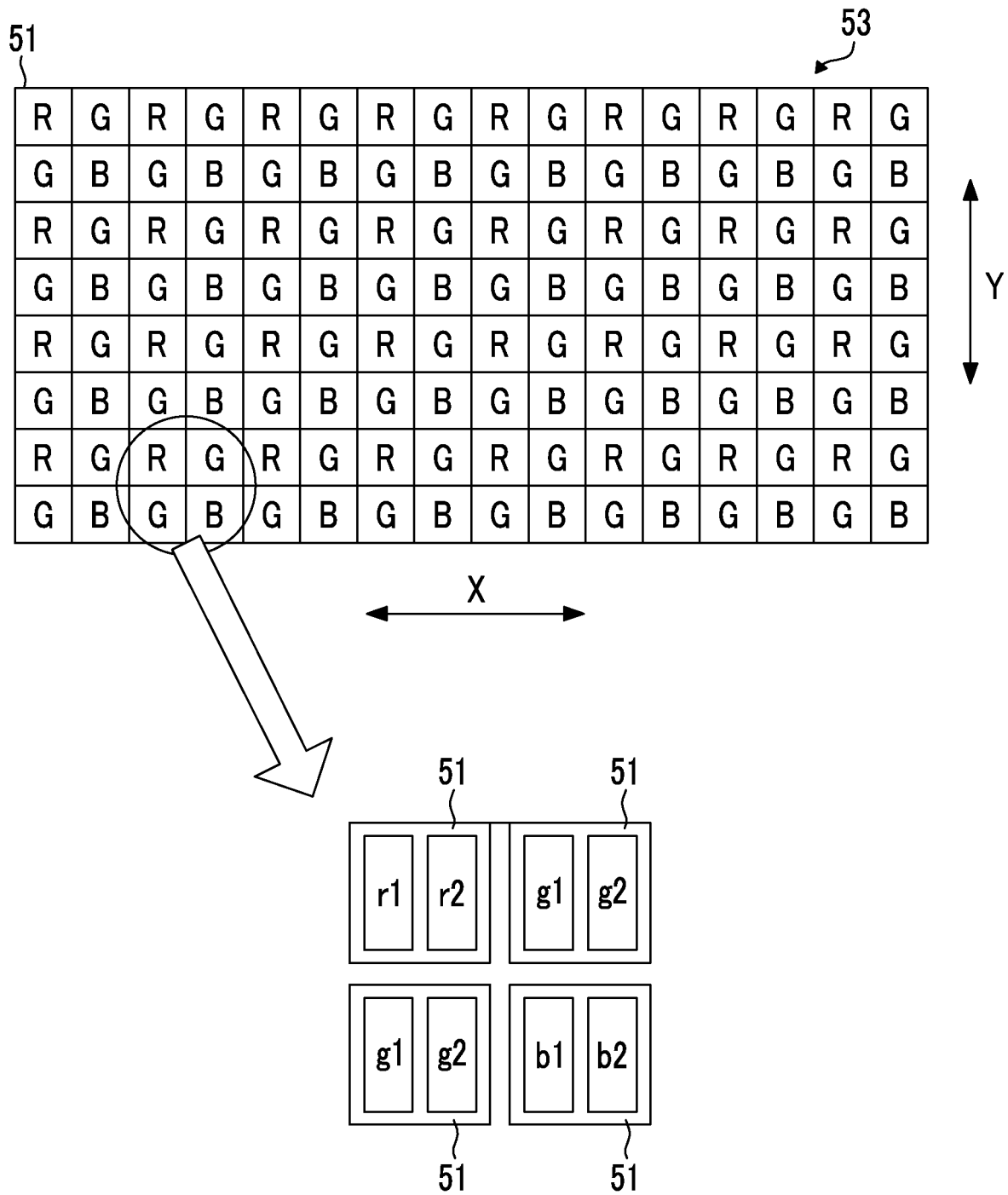
FIG. 6 is a diagram showing a configuration in which all pixels included in the imaging element 5 are used as imaging pixels 51 and each imaging pixel 51 is divided into two parts.

FIG. 6 is a diagram illustrating a configuration in which all pixels included in the imaging element 5 are used as imaging pixels 51 and each imaging pixel 51 is divided into two parts.

In the configuration of FIG. 6, each imaging pixel 51 with R in the imaging element 5 is divided into two parts, and the divided two parts are used as a phase difference detection pixel r1 and a phase difference detection pixel r2, respectively.

Further, each imaging pixel 51 with G in the imaging element 5 is divided into two parts, and the divided two parts are used as a phase difference detection pixel g1 and a phase difference detection pixel g2, respectively.

Furthermore, each imaging pixel 51 with B in the imaging element 5 is divided into two parts, and the divided two parts are used to as a phase difference detection pixel b1 and a phase difference detection pixel b2, respectively.

In this configuration, the phase difference detection pixels r1, g1, and b1 serve as the first signal detection units, respectively, and the phase difference detection pixels r2, g2, and b2 serve as the second signal detection units, respectively. Further, two phase difference detection pixels included in one imaging pixel 51 form a pair.

In the configuration example of FIG. 6, in a case where signals of the first signal detection unit and the second signal detection unit included in one imaging pixel 51 are added up, a normal imaging signal having no phase difference is obtained. That is, in the configuration of FIG. 6, it is possible to use all pixels as both of phase difference detection pixels and imaging pixels.

In this way, the imaging element 5 forms a sensor that has plural pair lines that are arranged in the column direction Y, in which each pair line is formed by plural pairs that are arranged in the row direction X and each pair includes the first signal detection unit and the second signal detection unit.

Figure 7:
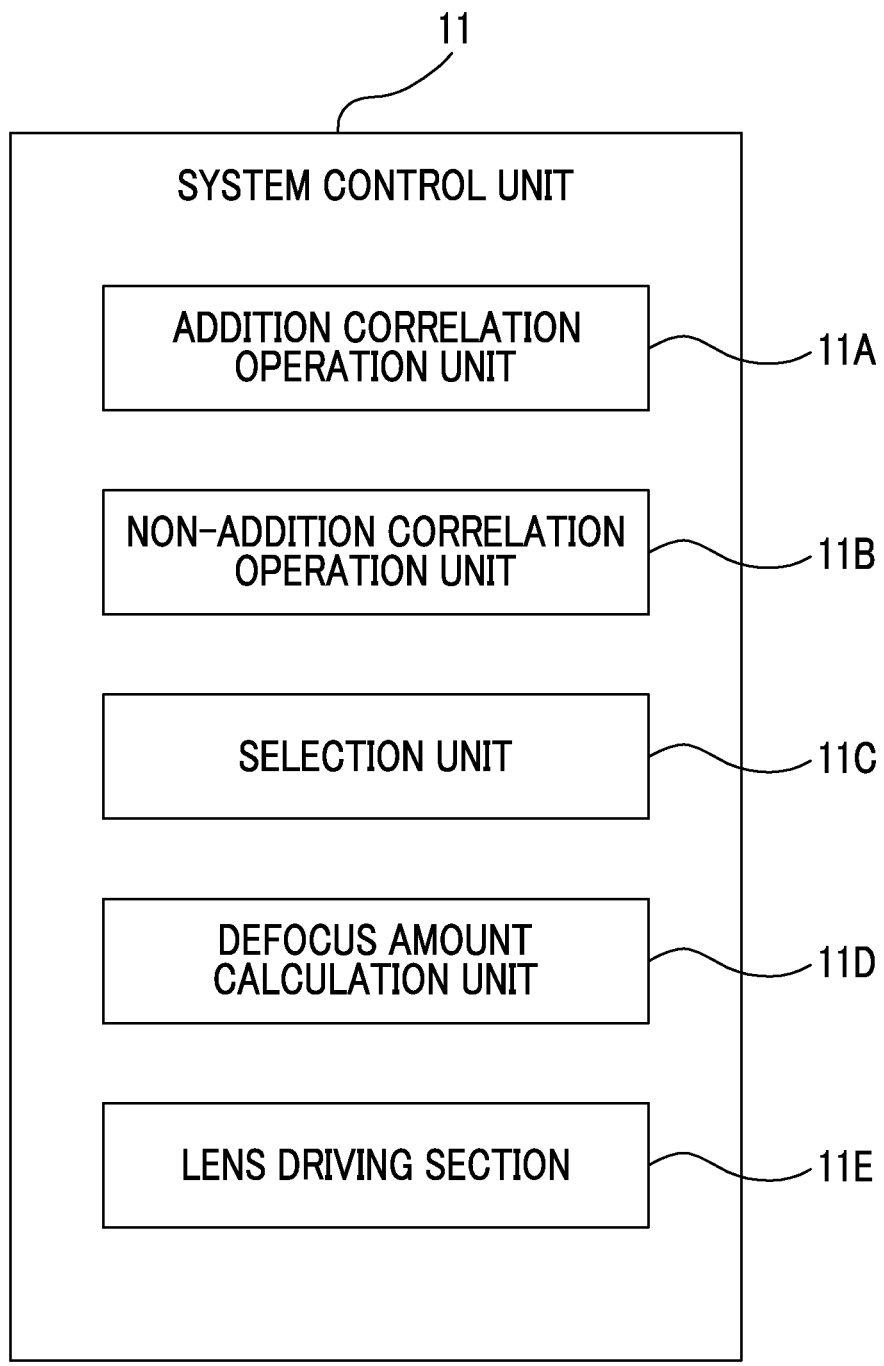
FIG. 7 is a functional block diagram of a system control unit 11 shown in FIG. 1.

FIG. 7 is a functional block diagram of the system control unit 11 shown in FIG. 1. The system control unit 11 executes the focusing control program stored in the ROM that is provided therein, to thereby function as an addition correlation operation unit 11A, a non-addition correlation operation unit 11B, a selection unit 11C, a defocus amount calculation unit 11D, a lens driving section 11E.

The addition correlation operation unit 11A performs a correlation operation between a first signal group obtained by adding up detection signals detected by the same phase difference detection pixels 52A of which positions in the row direction X are the same, included in all pair lines (hereinafter, referred to as N pair lines) disposed in a selected AF area 53 and a second signal group obtained by adding up detection signals detected by the same phase difference detection pixels 52B of which positions in the row direction X are the same, included in the N pair lines.

The addition correlation operation unit 11A calculates addition values of the detection signals detected by the same phase difference detection pixels 52A of which the positions in the row direction X are the same, included in the N pair lines or average values of the detection signals detected by the same phase difference detection pixels 52A of which the positions in the row direction X are the same, included in the N pair lines as the first signal group.

The addition correlation operation unit 11A calculates addition values of the detection signals detected by the same phase difference detection pixels 52B of which the positions in the row direction X are the same, included in the N pair lines or average values of the detection signals detected by the same phase difference detection pixels 52B of which the positions in the row direction X are the same, included in the N pair lines as the second signal group.

The addition correlation operation unit 11A performs an operation of the following expression (1) by setting the first signal group as $A_1(1), A_1(2), \ldots,$ and $A_1(k)$, setting the second signal group as $B_1(1), B_1(2), \ldots,$ and $B_1(k)$, and setting a certain shift amount in a case where the two signal groups shift in the row direction X as d (L is an arbitrary value), to thereby calculate a correlation value $S_1(d)$ between the first signal group and the second signal group.

[Expression 1]

$$S_1(d) = \sum_{x=1}^{k} |A_1(x) - B_1(x-d)| \quad (1)$$

$$d = -L, \ldots, -2, -1, 0, 1, 2, \ldots, L.$$

The non-addition correlation operation unit 11B performs, for each of N pair lines disposed in a selected AF area 53, a correlation operation between a third signal group that is a detection signal group formed by detection signals detected by the phase difference detection pixels 52A included in the pair line and a fourth signal group that is a detection signal group formed by detection signals detected by the phase difference detection pixels 52B included in the pair line.

The non-addition correlation operation unit 11B performs an operation of the following expression (2) by setting the third signal group as $A_2(1), A_2(2), \ldots,$ and $A_2(k)$ and setting the fourth signal group as $B_2(1), B_2(2), \ldots,$ and $B_2(k)$, to thereby calculate a correlation value $S_3(d)$ between the third signal group and the fourth signal group. The non-addition correlation operation unit 11B performs the operation of the following Expression (2) with respect to N pair lines, to thereby calculate N correlation values $S_3(d)$.

[Expression 2]

$$S_3(d) = \sum_{x=1}^{k} |A_2(x) - B_2(x-d)| \quad (2)$$

The non-addition correlation operation unit 11B calculates correlation values $S_2(d)$ on the basis of the N correlation value $S_3(d)$.

In a case where the first signal group and the second signal group are respectively calculated as addition values, the non-addition correlation operation unit 11B adds up correlation values corresponding to values having the same shift amounts in the N correlation value $S_3(d)$, and calculates the correlation value $S_2(d)$ indicating a relationship between the shift amount d and an addition value of the N correlation values.

Alternatively, in a case where the first signal group and the second signal group are respectively calculated as average values, the non-addition correlation operation unit 11B calculates average values of correlation values corresponding to values having the same shift amounts in the N correlation value $S_3(d)$, and calculates the correlation value $S_2(d)$ indicating a relationship between the shift amount d and an average value of the N correlation values.

The correlation value $S_1(d)$ calculated by the addition correlation operation unit 11A forms first result information that is information indicating a result of the correlation operation of the addition correlation operation unit 11A.

The correlation value $S_2(d)$ calculated by the non-addition correlation operation unit 11B forms second result information that is information indicating a result of the correlation operation based on the non-addition correlation operation unit 11B.

The selection unit 11C calculates a matching rate between the correlation value $S_1(d)$ calculated by the addition correlation operation unit 11A and the correlation value $S_2(d)$ calculated by the non-addition correlation operation unit 11B, and selects any one of the correlation value $S_1(d)$ or the correlation value $S_2(d)$ on the basis of the calculated matching rate.

Figure 8:
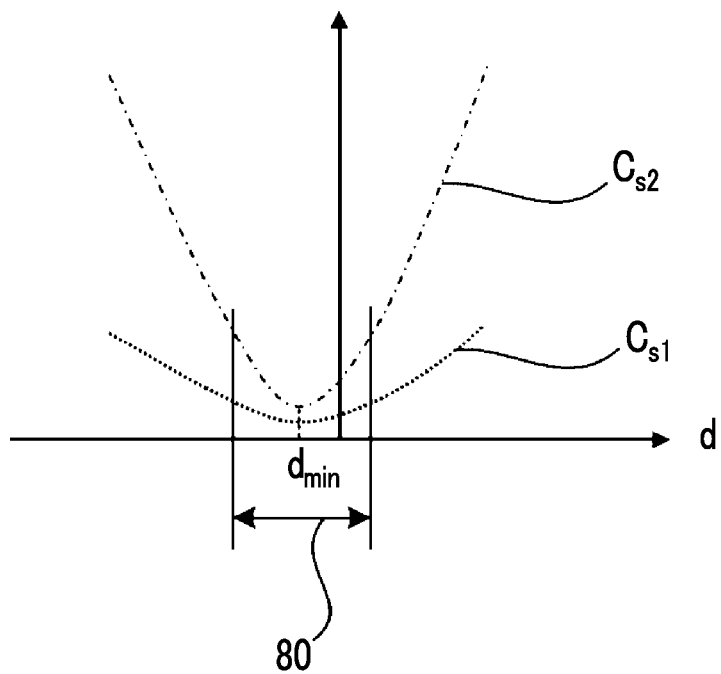
FIG. 8 is a diagram showing an example of a graph (correlation curve $C_{S1}$) indicated by a correlation value $S_1(d)$ and a graph (correlation curve $C_{S2}$) indicated by a correlation value $S_2(d)$.
Figure 9:
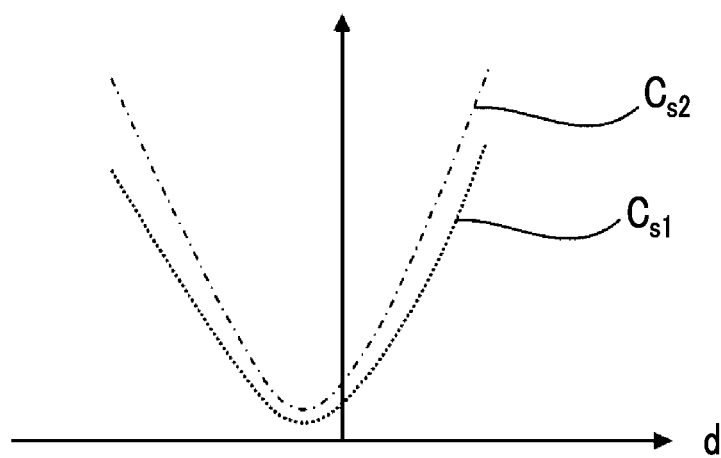
FIG. 9 is a diagram showing an example of a graph (correlation curve $C_{S1}$) indicated by a correlation value $S_1(d)$ and a graph (correlation curve $C_{S2}$) indicated by a correlation value $S_2(d)$.

FIGS. 8 and 9 are diagrams showing examples of a graph (correlation curve $C_{S1}$) indicated by the correlation value $S_1(d)$ and a graph (correlation curve $C_{S2}$) indicated by the correlation value $S_2(d)$. In FIGS. 8 and 9, a lateral axis represents a shift amount d, and a longitudinal axis represents a correlation value.

The selection unit 11C calculates an index indicating a similarity of shapes of the correlation curve $C_{S1}$ and the correlation curve $C_{S2}$ shown in FIGS. 8 and 9 as a matching rate.

For example, the selection unit 11C calculates a matching rate C between the correlation value $S_1(d)$ and the correlation value $S_2(d)$ by performing an operation of the following Expression (3) or (4).

A range in which a sum is taken in Expression (3) or (4) may be a range of a predetermined shift amount centering around a minimum value $d=d_{min}$ of a correlation curve indicated by the correlation value $S_1(d)$, but the entire range of the shift amount d may be used as the range in which the sum is taken. By limiting the range in which the sum is taken, it is possible to simplify the operation process.

[Expression 3]

$$C = \frac{\sum S_1(d)}{\sum S_2(d)} \quad (3)$$

[Expression 4]

$$C = \frac{1}{\sum (S_1(d) - S_2(d))} \quad (4)$$

The matching rate C calculated by the operation of Expression (3) shows a rate between an area surrounded by the correlation curve $C_{S1}$ and the lateral axis and an area surrounded by the correlation curve $C_{S2}$ and the lateral axis, in a range 80 of the shift amount d centering around the minimum value $d_{min}$ of the correlation curve $C_{S1}$, in the example shown in FIG. 8. As shown in FIG. 9, as the similarity of the shapes of the correlation curve $C_{S1}$ and the correlation curve $C_{S2}$ becomes higher, the matching rate C calculated by Expression (3) has a larger value.

The matching rate C calculated by the operation of Expression (4) represents a reciprocal of a value obtained by integrating and accumulating differences between respective correlation values of the correlation curve $C_{S1}$ and respective correlation values of the correlation curve $C_{S2}$ in the range 80, in the example shown in FIG. 8. As shown in FIG. 9, as the similarity of the shapes of the correlation curve $C_{S1}$ and the correlation curve $C_{S2}$ becomes higher, the matching rate C calculated by Expression (4) has a larger value.

In a case where the matching rate C exceeds a predetermined matching threshold value (for example, in the case of the result as shown in FIG. 9), the selection unit 11C selects the correlation value $S_1(d)$. In a case where the matching rate C is equal to or smaller than the matching threshold value (for example, in the case of the result as shown in FIG. 8), the selection unit 11C selects the correlation value $S_2(d)$.

The defocus amount calculation unit 11D calculates a shift amount when a correlation value becomes a minimum value as a phase difference value, on the basis of the correlation value $S_1(d)$ and the correlation value $S_2(d)$. The defocus amount calculation unit 11D converts the calculated phase difference into a defocus amount, and decides a target position of the focus lens on the basis of the defocus amount.

The lens driving section 11E controls the lens control unit 4 to move the focus lens to the target position decided by the defocus amount calculation unit 11D.

Figure 10:
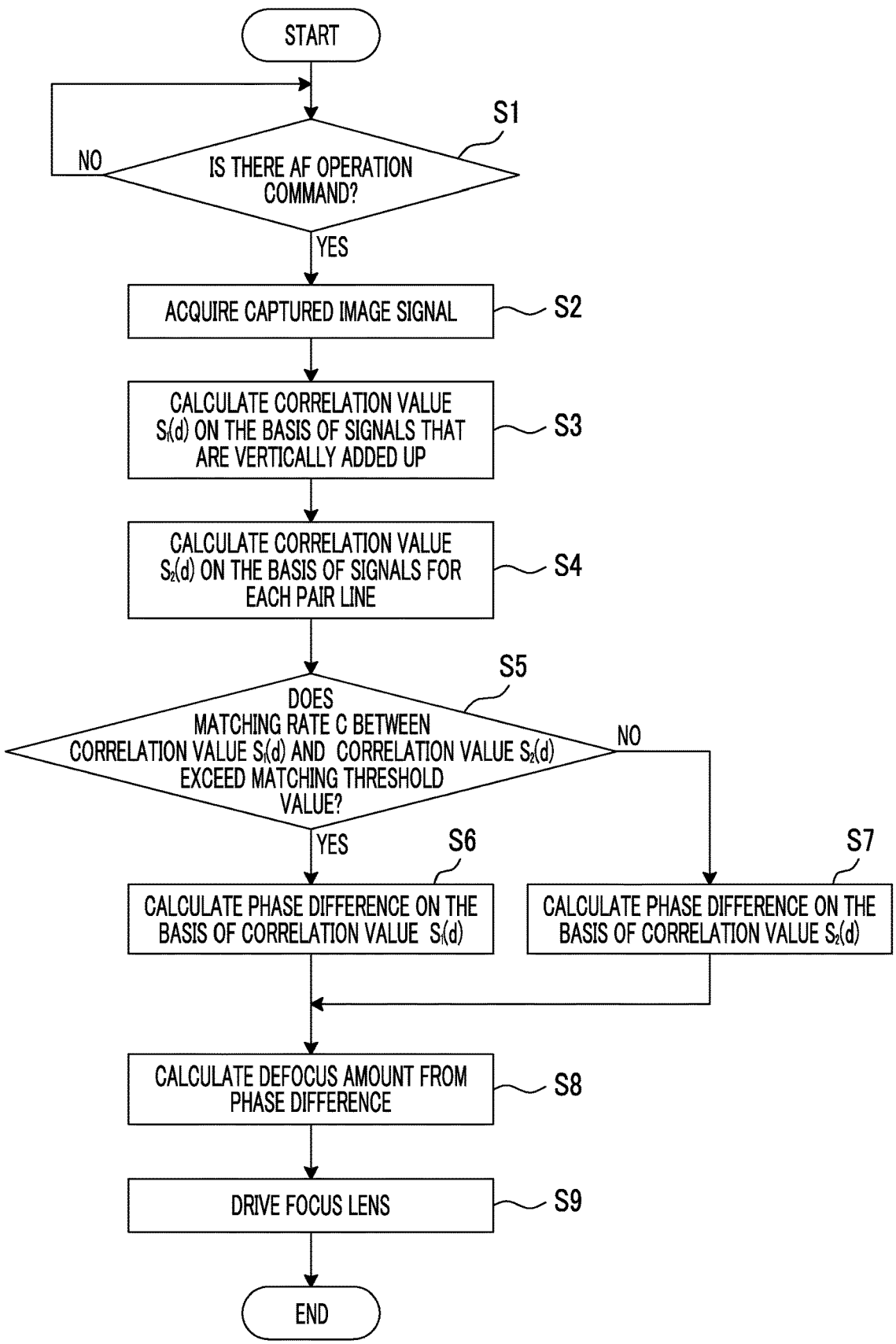
FIG. 10 is a flowchart for describing a focusing control operation of the digital camera shown in FIG. 1.

FIG. 10 is a flowchart for describing a focusing control operation of the digital camera shown in FIG. 1.

In a case where the operation unit 14 is operated in a state where a certain area is selected from nine AF areas 53 by a user of the digital camera and a command for performing AF is input (YES in step S1), the system control unit 11 causes the imaging element 5 to perform imaging for AF. The system control unit 11 acquires captured image signals output from the selected AF area 53 of the imaging element 5 due to the imaging (step S2).

The addition correlation operation unit 11A calculates average values of detection signals detected by the phase difference detection pixels 52A of which the positions in the row direction X are the same, included in all pair lines included in the selected AF area 53, and calculates average values of detection signals detected by the phase difference detection pixels 52B of which the positions in the row direction X are the same, included in all the pair lines, among the captured image signals acquired in step S2. Further, the addition correlation operation unit 11A performs a correlation operation between the calculated average values to calculate the correlation values $S_1(d)$ (step S3).

The non-addition correlation operation unit 11B performs, for each of the pair lines included in the selected AF area 53, a correlation operation between a detection signal group detected by the phase difference detection pixels 52A included in the pair line and a detection signal group detected by the phase difference detection pixels 52B included in the pair line, among the captured image signals acquired in step S2, to calculate the correlation values $S_2(d)$ on the basis of the result of the correlation operation (step S4).

Then, the selection unit 11C calculates a matching rate C between the correlation value $S_1(d)$ calculated in step S3 and the correlation value $S_2(d)$ calculated in step S4, and determines whether the calculated matching rate C exceeds a matching threshold value (step S5).

In a case where it is determined that the matching rate C exceeds the matching threshold value (YES in step S5), the selection unit 11C selects the correlation value $S_1(d)$. Further, the defocus amount calculation unit 11D calculates a shift amount d in which the correlation value $S_1(d)$ selected by the selection unit 11C becomes a minimum value as a phase difference value (step S6).

On the other hand, in a case where it is determined that the matching rate C is equal to or smaller than the matching threshold value (NO in step S5), the selection unit 11C selects the correlation value $S_2(d)$. Further, the defocus amount calculation unit 11D calculates a shift amount d in which the correlation value $S_2(d)$ selected by the selection unit 11C becomes a minimum value as a phase difference value (step S7).

After step S6 and step S7, the defocus amount calculation unit 11D converts the calculated phase difference into a defocus amount, and decides a target position of the focus lens on the basis of the defocus amount (step S8).

After step S8, the lens driving section 11E controls the focus lens to move the target position decided by the defocus amount calculation unit 11D (step S9), and then, AF is terminated.

As described above, the digital camera shown in FIG. 1 selects the correlation value $S_1(d)$ or the correlation value $S_2(d)$ on the basis of the matching rate C between the correlation value $S_1(d)$ and the correlation value $S_2(d)$, and drives the focus lens on the basis of the selected correlation value.

In a case where the matching rate C is high, by driving the focus lens on the basis of the correlation value $S_1(d)$ that is a result of a correlation operation that is not easily affected by noise, it is possible to perform AF with high accuracy.

On the other hand, in a case where the matching rate C is low, results of correlation operations are different from each other between a case where detection signals of phase difference detection pixels are added up and a case where detection signals of phase difference detection pixels are not added up, and it may be determined that this situation is a situation that contrast is lowered due to the addition.

Accordingly, in such a case, by driving the focus lens on the basis of the correlation value $S_2(d)$ that is a result of the correlation operation with a low possibility that contrast is lowered, it is possible to perform AF with high accuracy.

It is preferable that the selection unit 11C variably controls the matching threshold value.

For example, as the brightness of a subject imaged in the selected AF area 53 is darker (the brightness is lower), the selection unit 11C sets the matching threshold value to be smaller.

Alternatively, as an imaging sensitivity (ISO sensitivity) of the digital camera is higher, the selection unit 11C sets the matching threshold value to be smaller. The ISO sensitivity is a standard defined by the International Standard Organization.

In a situation where the brightness of a subject is dark or in a situation where the imaging sensitivity is set to be high, noise components included in a captured image signal become large.

Accordingly, in such a situation, by increasing a probability that the correlation value $S1(d)$ that is not easily affected by noise may be selected by setting the matching threshold value to be small, it is possible to enhance the AF accuracy.

Hereinafter, a modification example of the digital camera shown in FIG. 1 will be described.

First Modification Example

FIG. 11 is a diagram illustrating a modification example of functional blocks of the system control unit 11 shown in FIG. 7. The system control unit 11 shown in FIG. 11 has the same configuration as in FIG. 7 except that a reliability determination unit 11F is additionally provided.

The reliability determination unit 11F determines a reliability of the correlation value $S_1(d)$ calculated by the addition correlation operation unit 11A. Hereinafter, a reliability determination method of the correlation value $S_1(d)$ will be described.

Figure 12A:
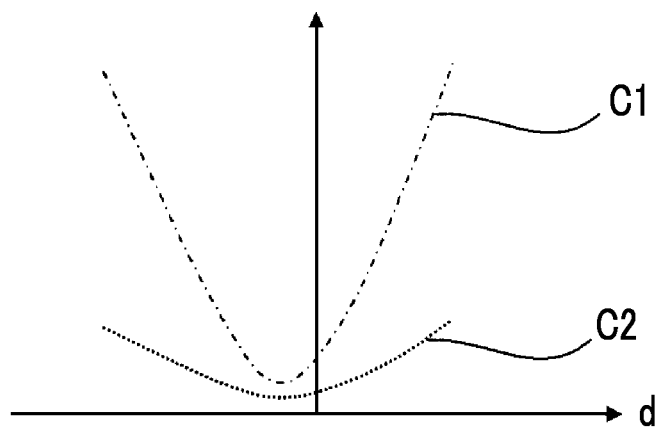
FIG. 12A and FIG. 12B are diagrams respectively showing an example of a graph (correlation curve $C_{S1}$) indicated by a correlation value $S_1(d)$.
Figure 12B:
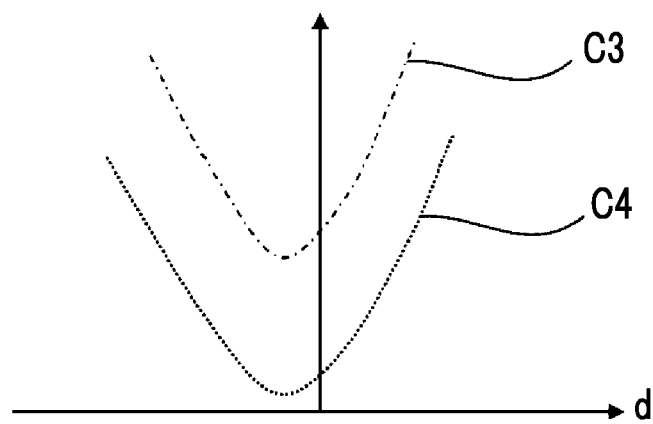

FIG. 12A and FIG. 12B are diagrams respectively showing an example of a graph (correlation curve $C_{S1}$) indicated by the correlation value $S_1(d)$.

In the correlation curve $C_{S1}$, it can be determined that as a shape close to a minimum value of the correlation value becomes flat, a detection signal group used for a correlation operation shows a low contrast. For example, in the example shown in FIG. 12A, a correlation curve C1 has a higher reliability compared with a reliability of a correlation curve C2.

Then, the reliability determination unit 11F calculates a flatness of the shape close to the minimum value of the correlation curve, and determines the reliability of the correlation value $S_1(d)$ on the basis of the calculated flatness.

Specifically, the reliability determination unit 11F calculates a coefficient a of a quadratic function v shown in Expression (5), using plural correlation values close to the minimum value of the correlation curve $C_{S1}$ and shift amounts corresponding to the correlation values, and handles the coefficient a as a numerical value indicating the reliability of the correlation value $S_1(d)$. As the coefficient a becomes larger, the reliability of the correlation value $S_1(d)$ becomes higher.

$$v = a \cdot s2 + b \cdot s + s + c \quad (5)$$

where v is a correlation value, s is a shift amount, and a, b, and c are coefficients.

Further, in the correlation curve $C_{S1}$, it can be determined that as the minimum value becomes smaller, a correlation between two signal groups that are targets for a correlation operation becomes larger. For example, in the example shown in FIG. 12B, a reliability of a correlation curve C4 has a higher reliability compared with a reliability of a correlation curve C3.

Accordingly, the reliability determination unit 11F handles a reciprocal of the size of the minimum value of the correlation curve $C_{S1}$ as a numerical value indicating the reliability of the correlation value $S_1(d)$. As the minimum value of the correlation curve $C_{S1}$ becomes smaller, the reliability of the correlation value $S_1(d)$ becomes higher.

Even in a case where a subject image captured in the AF area 53 has a low contrast, there is a case where the minimum value of the correlation curve $C_{S1}$ becomes small.

Thus, it is preferable that the reliability determination unit 11F first calculates the coefficient a of the quadratic function v in Expression (5) and determines the reliability based on the size of the minimum value only in a case where the coefficient a is sufficiently large.

In the first modification example, as a result of the determination in the reliability determination unit 11F, in a case where the reliability of the correlation value $S_1(d)$ exceeds a predetermined reliability threshold value, the selection unit 11C selects the correlation value $S_1(d)$.

As the result of the determination in the reliability determination unit 11F, in a case where the reliability of the correlation value $S_1(d)$ is equal to or smaller than the reliability threshold value, the selection unit 11C selects any one of the correlation value $S_1(d)$ or the correlation value $S_2(d)$ on the basis of the above-mentioned matching rate C.

Figure 13:
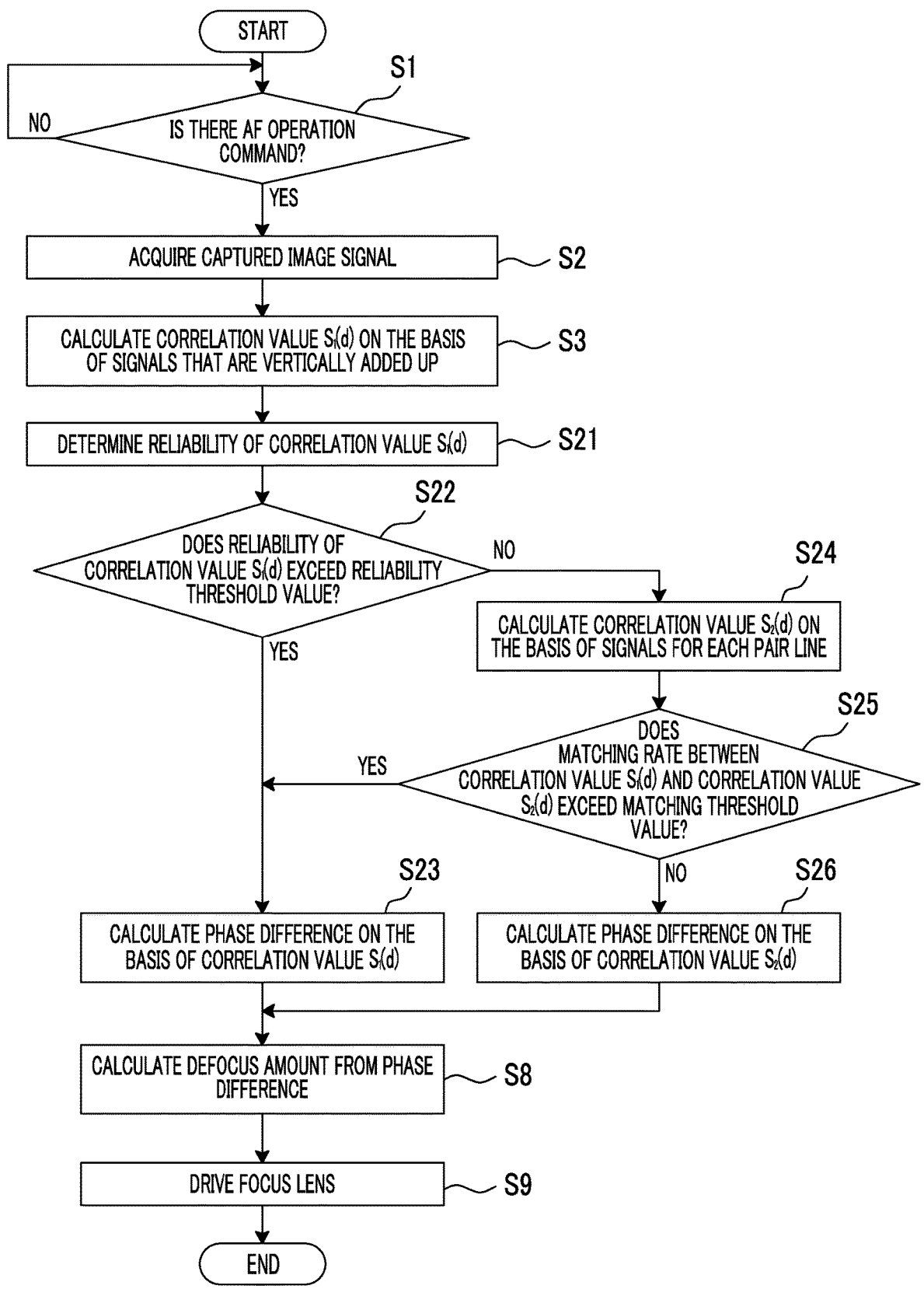
FIG. 13 is a flowchart for describing a first modification example of the focusing control operation of the digital camera shown in FIG. 1.

FIG. 13 is a flowchart for describing the first modification example of the focusing control operation of the digital camera shown in FIG. 1. In FIG. 13, the same reference numerals are given to the same processes as in FIG. 10, and description thereof will not be repeated.

After the correlation value $S_1(d)$ is calculated in step S3, the reliability determination unit 11F determines the reliability of the correlation value $S_1(d)$, on the basis of the shape close to the minimum value of the correlation curve indicated by the correlation value $S_1(d)$, the size of the minimum value, or the like (step S21).

In a case where the reliability of the correlation value $S_1(d)$ determined in step S21 exceeds a reliability threshold value (YES in step S22), the correlation value $S_1(d)$ is selected by the selection unit 11C. Then, the defocus amount calculation unit 11D calculates a shift amount when the selected correlation value $S_1(d)$ becomes a minimum value as a phase difference (step S23).

On the other hand, in a case where the reliability of the correlation value $S_1(d)$ determined in step S21 is equal to or smaller than the reliability threshold value (NO in step S22), the non-addition correlation operation unit 11B calculates the correlation value $S_2(d)$ on the basis of the captured image signal acquired in step S2 (step S24).

After step S24, the selection unit 11C calculates a matching rate C between the correlation value $S_1(d)$ calculated in step S3 and the correlation value $S_2(d)$ calculated in step S24, and determines whether the calculated matching rate C exceeds a matching threshold value (step S25).

In a case where it is determined that the matching rate C exceeds the matching threshold value (YES in step S25), the selection unit 11C selects the correlation value $S_1(d)$, and then, the process of step S23 is performed.

In a case where it is determined that the matching rate C is equal to or smaller than the matching threshold value (NO in step S25), the selection unit 11C selects the correlation value $S_2(d)$. Further, the defocus amount calculation unit 11D calculates a shift amount in which the selected correlation value $S_2(d)$ becomes a minimum value as a phase difference value (step S26).

After step S23 and step S26, the process of step S8 and subsequent processes are performed.

As described above, according to the first modification example, in a case where the reliability of the correlation value $S_1(d)$ is high, the focus lens is driven on the basis of the correlation value $S_1(d)$, without performing a correlation operation necessary for calculation of the correlation value $S_2(d)$. Accordingly, according to imaging situations, it is possible to reduce the amount and time of the operation necessary for operation of the correlation value $S_2(d)$, to thereby reduce an AF time and power consumption.

On the other hand, in a case where the reliability of the correlation value $S_1(d)$ is low, any one of the correlation value $S_1(d)$ or the correlation value $S_2(d)$ is selected on the basis of the matching rate C, and then, the focus lens is driven on the basis of the selected correlation value. Thus, as described above, it is possible to select an optimal correlation value according to subjects, and to enhance the accuracy of AF.

Second Modification Example

A configuration of functional blocks of the system control unit 11 in a second modification example is the same as that shown in FIG. 7.

In the second modification example, the selection unit 11C selects the correlation value $S_1(d)$ in a case where the defocus amount based on the correlation value $S_1(d)$ calculated by the addition correlation operation unit 11A exceeds a predetermined defocus threshold value.

The selection unit 11C selects any one of the correlation value $S_1(d)$ or the correlation value $S_2(d)$ on the basis of the matching rate C between the correlation value $S_1(d)$ and the correlation value $S_2(d)$ in a case where the defocus amount is equal to or smaller than the defocus threshold value.

Figure 14:
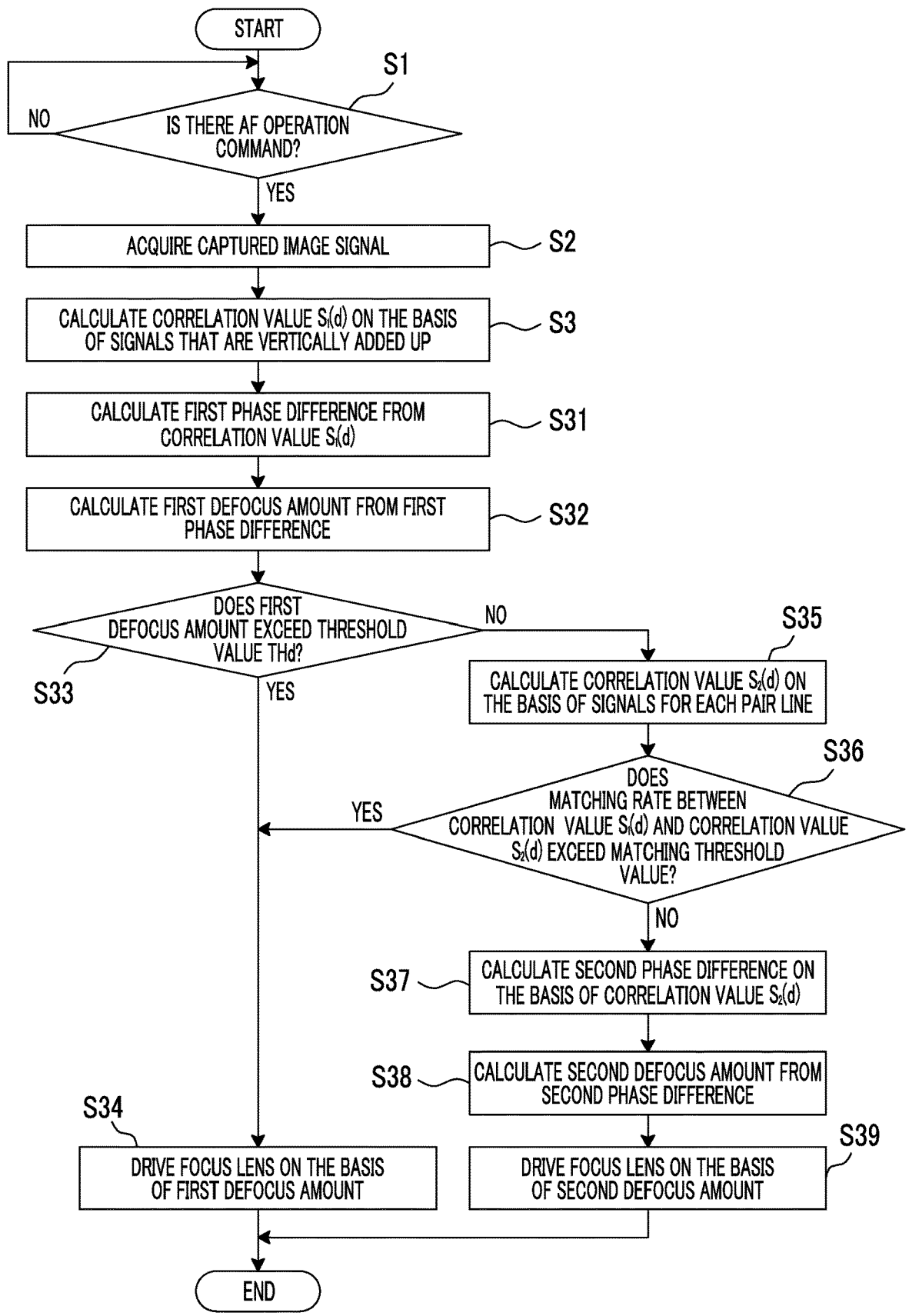
FIG. 14 is a flowchart for describing a second modification example of the focusing control operation of the digital camera shown in FIG. 1.

FIG. 14 is a flowchart for describing the second modification example of the focusing control operation of the digital camera shown in FIG. 1. In FIG. 14, the same reference numerals are given to the same processes as in FIG. 10, and description thereof will not be repeated.

After the correlation value $S_1(d)$ is calculated in step S3, the defocus amount calculation unit 11D calculates a shift amount in which the correlation value $S_1(d)$ becomes a minimum value as a first phase difference (step S31), and then, calculates a first defocus amount from the calculated first phase difference (step S32).

The selection unit 11C determines whether the first defocus amount calculated in step S32 exceeds a defocus threshold value THd (step S33).

In a case where the first defocus amount exceeds the defocus threshold value THd (YES in step S33), the selection unit 11C selects the correlation value $S_1(d)$. Subsequently, the defocus amount calculation unit 11D decides a target position of the focus lens on the basis of the first defocus amount calculated on the basis of the correlation value $S_1(d)$. Then, the lens driving section 11E drives the focus lens to the target position (step S34).

The defocus threshold value THd is set to a value calculated by the following Expression (6) when an F-Number of the stop 2 is represented as f, an allowable confusion circle is represented as σ [um], and K represents an arbitrary coefficient. Here, ε represents a focal depth.

$$THd = K \times \varepsilon$$

$$\varepsilon = f \times \sigma \qquad (6)$$

In a case where the first defocus amount is equal to or smaller than the defocus threshold value THd (NO in step S33), the non-addition correlation operation unit 11B calculates the correlation value $S_2(d)$ on the basis of the captured image signal acquired in step S2 (step S35).

After step S35, the selection unit 11C calculates a matching rate C between the correlation value $S_1(d)$ calculated in step S3 and the correlation value $S_2(d)$ calculated in step S35, and determines whether the calculated matching rate C exceeds a matching threshold value (step S36).

In a case where it is determined that the matching rate C exceeds the matching threshold value (YES in step S36), the selection unit 11C selects the correlation value $S_1(d)$, and then, the process of step S34 is performed.

In a case where it is determined that the matching rate C is equal to or smaller than the matching threshold value (NO in step S36), the selection unit 11C selects the correlation value $S_2(d)$. Further, the defocus amount calculation unit 11D calculates a shift amount in which the selected correlation value $S_2(d)$ becomes a minimum value as a second phase difference value (step S37).

Subsequently, the defocus amount calculation unit 11D calculates a second defocus amount from the calculated second phase difference (step S38), and decides a target position of the focus lens on the basis of the second defocus amount. Then, the lens driving section 11E drives the focus lens to the target position (step S39).

As described above, according to the second modification example, in a case where the defocus amount based on the correlation value $S_1(d)$ is large, that is, in a state where blurriness of a captured image is large, the calculation of the correlation value $S_2(d)$ is not performed, and the focus lens is driven on the basis of the correlation value $S_1(d)$.

In the state where the blurriness is large, there is a low possibility that the contrast is lowered as detection signals of phase difference detection pixels in plural pair lines are added up. Accordingly, in such a case, by driving the focus lens on the basis of the correlation value $S_1(d)$ capable of reducing the influence of noise, it is possible to enhance the accuracy of AF.

Further, since a correlation operation for calculating the correlation value $S_2(d)$ is not performed, it is possible to reduce the amount of the operation and the operation time, to thereby reduce the AF time and power consumption.

On the other hand, in a case where the defocus amount based on the correlation value $S_1(d)$ is small, any one of the correlation value $S_1(d)$ or the correlation value $S_2(d)$ is selected on the basis of the matching rate C, and then, the focus lens is driven on the basis of the selected correlation value. Thus, as described above, it is possible to select an optimal correlation value according to subjects, to thereby enhance the AF accuracy.

In the above-described digital camera, the imaging element 5 for imaging a subject is also used as an AF sensor, but a configuration in which an exclusive sensor other than the imaging element 5 is provided in the digital camera may be used.

For example, a configuration in which a sensor exclusive for phase difference detection (a sensor in which the phase difference detection pixels as shown in FIG. 4 are only disposed) is provided in the lens device 40, light of an imaging optical system is imported using the sensor, and a correlation operation is performed using an output of the sensor may be used.

In the case of this configuration, a configuration in which the lens control unit 4 of the lens device 40 has respective functional blocks of the system control unit 11 may be used.

In the above description, the digital camera is shown as an example, but for example, the invention may be applied to a broadcasting imaging system.

Figure 15:
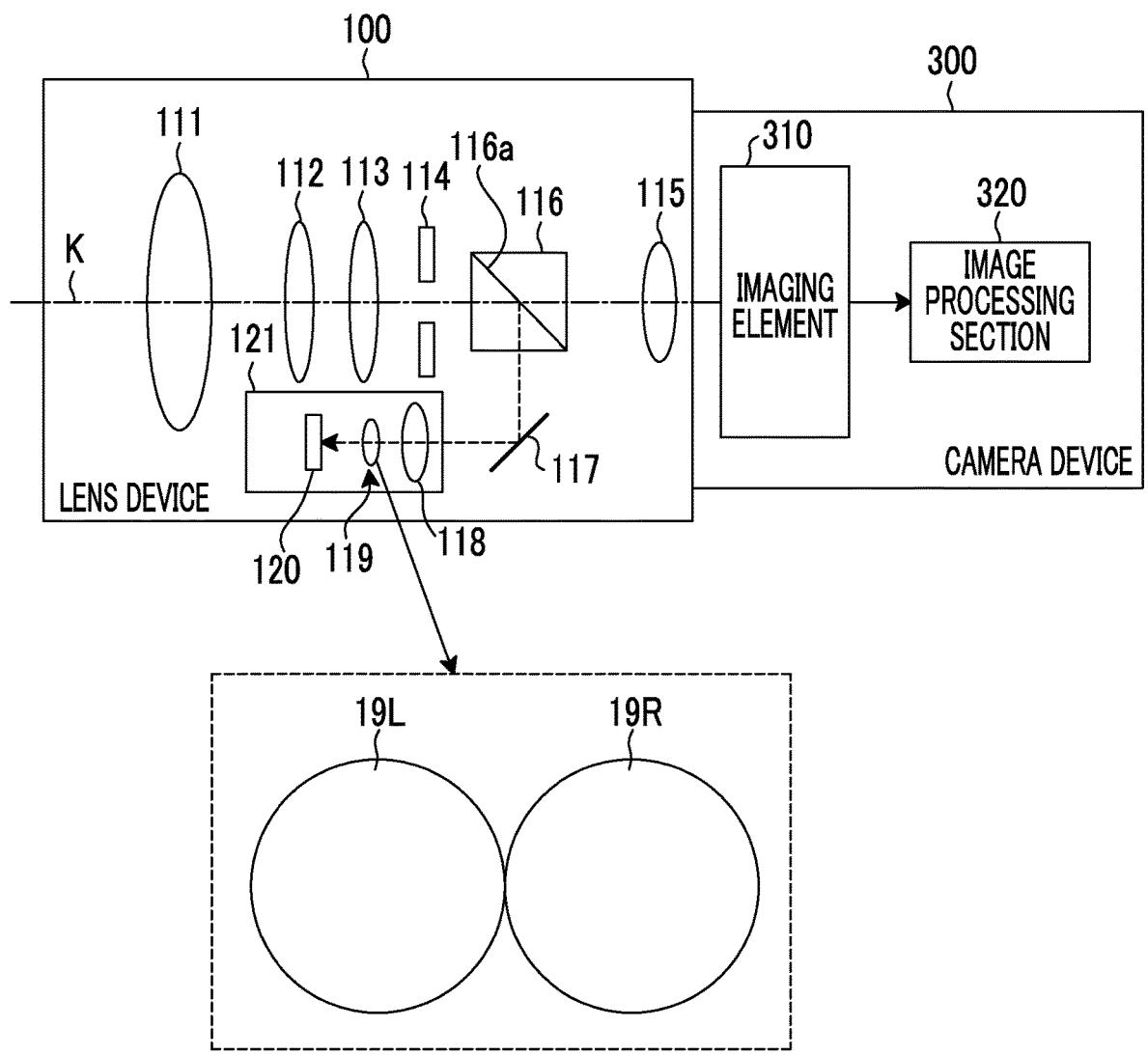
FIG. 15 is a diagram showing a schematic configuration of an imaging system that is an example of the imaging device according to the embodiment of the invention.

FIG. 15 is a diagram showing a schematic configuration of an imaging system that is an example of the imaging device according to the embodiment of the invention. The imaging system is a work system for broadcasting, movies, or the like.

The imaging system shown in FIG. 15 includes a lens device 100, and a camera device 300 on which the lens device 100 is mounted.

The lens device 100 includes a focus lens 111, zoom lenses 112 and 113, a stop 114, and a master lens group 115, which are sequentially arranged from a subject side.

The focus lens 111, the zoom lenses 112 and 113, the stop 114, and the master lens group 115 form an imaging optical system. The imaging optical system includes at least the focus lens 111.

The lens device 100 further includes a beam splitter 116 including a reflecting surface 116a, a mirror 117, a condenser lens 118, a separator lens 119, and an AF unit 121 including an imaging element 120. The imaging element 120 is an image sensor such as a CCD type image sensor or a CMOS type image sensor having plural pixels that are two-dimensionally arranged.

The beam splitter 116 is disposed between the stop 114 and the master lens group 115 on an optical axis K.

The beam splitter 116 transmits a part (for example, 80% of subject light) of the subject light that is incident onto the imaging optical system and passes through the stop 114, and reflects the remaining part (for example, 20% of the subject light) of the subject light from the reflecting surface 116a in a direction orthogonal to the optical axis K.

The position of the beam splitter 116 is not limited to the position shown in FIG. 15, and may be disposed at a position behind a lens of the imaging optical system disposed to be closest to a subject on the optical axis K.

The mirror 117 is disposed on an optical path of light reflected from the reflecting surface 116a of the beam splitter 116, and reflects the light to be incident onto the condenser lens 118 of the AF unit 121.

The condenser lens 118 collects light reflected from the mirror 117.

The separator lens 119 includes two lenses 19R and 19L that are disposed side by side in one direction (a horizontal direction in the example of FIG. 15) with the optical axis of the imaging optical system being interposed therebetween, as shown in an enlarged front view indicated by a broken line in FIG. 15.

The subject light condensed by the condenser lens 118 passes each of the two lenses 19R and 19L, and is imaged at different positions on a light-receiving surface (surface on which plural pixels are disposed) of the imaging element 120. That is, a pair of subject light images that shifts from each other in the one direction is imaged on the light-receiving surface of the imaging element 120.

The beam splitter 116, the mirror 117, the condenser lens 118, and the separator lens 119 function as an optical element that causes a part of subject light that is incident onto the imaging optical system to be incident onto an imaging element 310 of the camera device 300 that captures a subject light image through the imaging optical system and causes the remaining part of the subject light to be incident onto the imaging element 120.

A configuration in which the mirror 117 is removed and light reflected from the beam splitter 116 is directly incident onto the condenser lens 118 may be used.

The imaging element 120 is an area sensor in which plural pixels are two-dimensionally disposed on a light-receiving surface, and outputs an image signal based on each of two subject light images formed on the light-receiving surface. That is, the imaging element 120 outputs a pair of image signals that shifts from each other in the horizontal direction with respect to one subject light image formed by the imaging optical system.

By using such an area sensor as the imaging element 120, compared with a configuration in which line sensors are used, it is possible to avoid a difficulty in an operation for accurately matching positions of the line sensors.

Each pixel that outputs one of the pair of image signals that shifts from each other in the horizontal direction, among pixels included in the imaging element 120, forms each first signal detection unit that receives one beam among a pair of beams that passes through two different parts arranged in the horizontal direction in a pupil region of the imaging optical system and detects a signal depending on the intensity of received light.

Each pixel that outputs the other one of the pair of image signals that shifts from each other in the horizontal direction, among the pixels included in the imaging element 120, forms each second signal detection unit that receives the other beam among the pair of beams that passes through two different parts arranged in the horizontal direction in the pupil region of the imaging optical system and detects a signal depending on the intensity of received light.

In this embodiment, the imaging element 120 is used as the area sensor, but instead of the imaging element 120, a configuration in which a line sensor in which plural pixels that form the first signal detection units are two-dimensionally arranged is disposed at a position that faces the lens 19R and a line sensor in which plural pixels that form the second signal detection units are two-dimensionally arranged is disposed at a position that faces the lens 19R may be used.

The camera device 300 includes an imaging element 310 such as a CCD image sensor or a CMOS image sensor disposed on the optical axis K of the lens device 100, and an image processing section 320 that processes an image signal obtained by capturing a subject light image using the imaging element 310 to generate captured image data.

The lens device 100 includes a driving section that drives the focus lens 111 and a system control unit that controls the driving section. Further, the system control unit executes the above-described focusing control program to function as the above-described respective functional blocks.

Signals output from the first signal detection units of the imaging element 120 correspond to detection signals of the above-described phase difference detection pixels 52A. Signals output from the second signal detection units of the imaging element 120 correspond to detection signals of the above-described phase difference detection pixels 52B. In this imaging system, the system control unit of the lens device 100 functions as a focusing control device.

Hereinafter, an embodiment in which a smart phone with a camera is used as the imaging device will be described.

Figure 16:
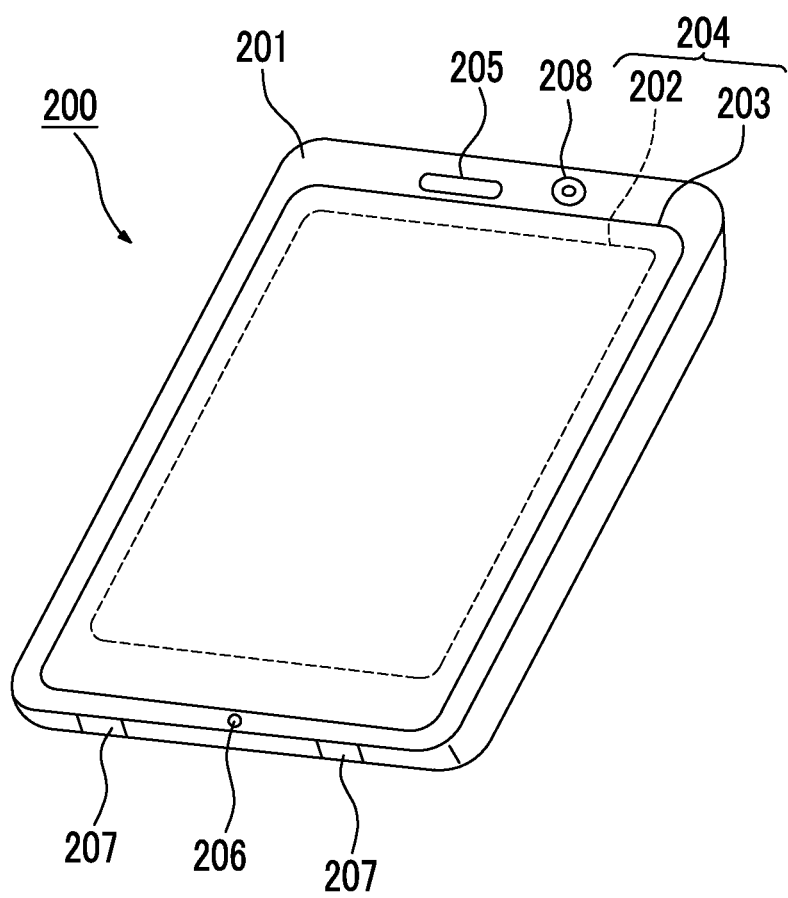
FIG. 16 is a diagram illustrating appearance of a smart phone 200 that is an example of the imaging device according to the embodiment of the invention.

FIG. 16 is a diagram showing an appearance of a smart phone 200 which is an embodiment of the imaging device of the invention. The smart phone 200 shown in FIG. 16 includes a flat housing 201, and a display input unit 204 that is disposed on one surface of the housing 201 and includes a display panel 202 which is a display unit and an operation panel 203 which is an input unit, in which the display panel 202 and the operation panel 203 are integrally formed.

Further, the housing 201 includes a speaker 205, a microphone 206, an operation unit 207, and a camera unit 208. The configuration of the housing 201 is not limited thereto, and for example, a configuration in which the display unit and the input unit are independently provided may be employed, or a configuration in which a folding structure or a slide mechanism is provided may be employed.

Figure 17:
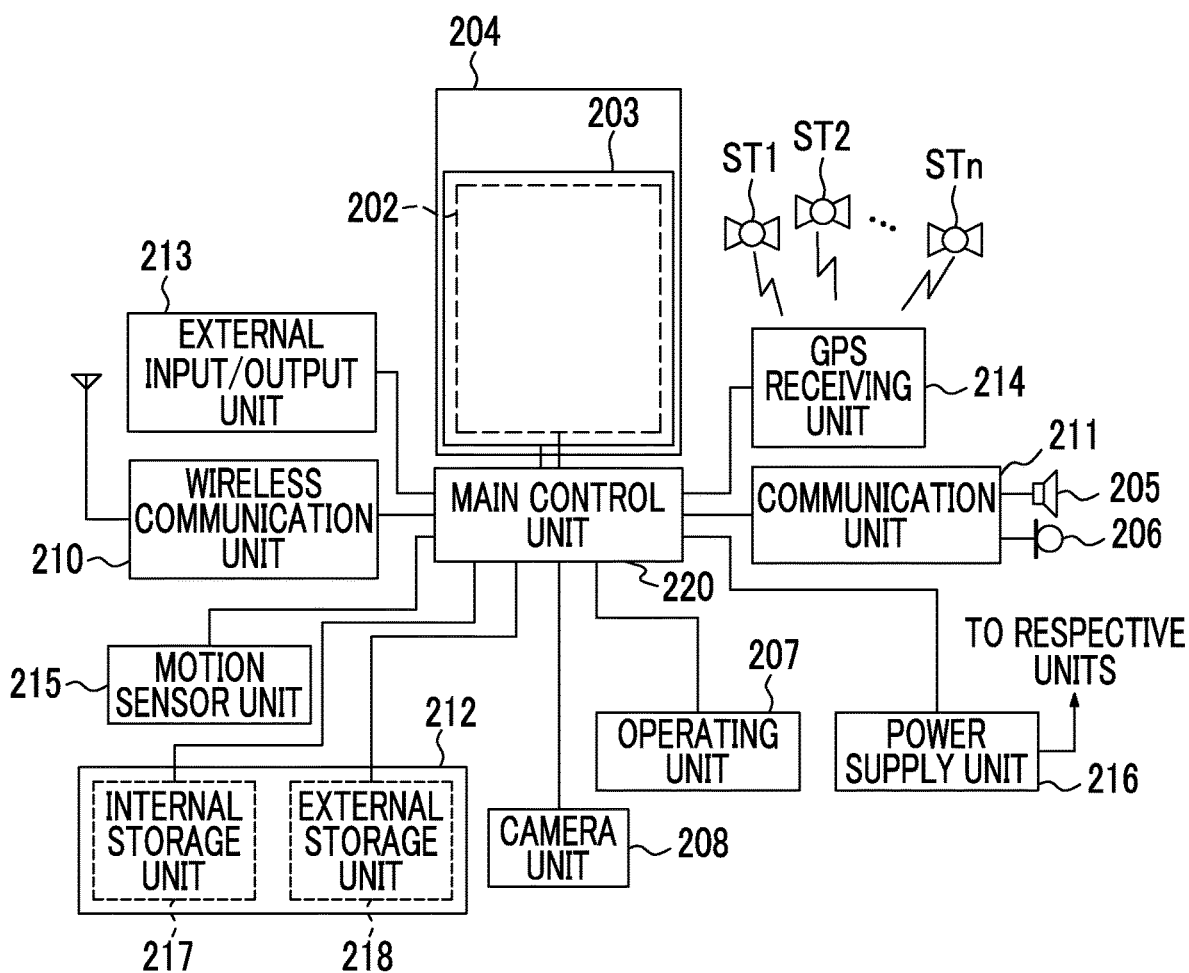
FIG. 17 is a block diagram illustrating a configuration of the smart phone 200 shown in FIG. 16.

FIG. 17 is a block diagram showing the configuration of the smart phone 200 shown in FIG. 16.

As shown in FIG. 17, as main components of the smart phone, a wireless communication unit 210, the display input unit 204, a communication unit 211, the operation unit 207, the camera unit 208, a storage unit 212, an external input/output unit 213, a global positioning system (GPS) receiving unit 214, a motion sensor unit 215, a power source unit 216, and a main control unit 220 are provided.

Further, as main functions of the smart phone 200, a wireless communication function for performing mobile wireless communication through a base station device BS (not shown) and a mobile communication network NW (not shown) is provided.

The wireless communication unit 210 performs wireless communication with respect to the base station device BS included in the mobile communication network NW according to a command of the main control unit 220. The wireless communication unit 210 performs transmission and reception of a variety of file data such as sound data or image data, e-mail data, or the like, or performs reception of Web data, streaming data, or the like using the wireless communication.

The display input unit 204 is a so-called touch panel that displays an image (a static image and a video image), character information, or the like under the control of the main control unit 220 to visually transmit information to a user, and detects a user operation with respect to the displayed information. The display input unit 204 includes the display panel 202 and the operation panel 203.

The display panel 202 uses a liquid crystal display (LCD), an organic electro-luminescence display (OELD), or the like as a display device.

The operation panel 203 is a device that is placed so that an image displayed on a display surface of the display panel 202 can be visually recognized and detects one or plural coordinates operated by a user's finger or a stylus. In a case where the device is operated by the user's finger or the stylus, a detection signal generated due to the operation is output to the main control unit 220. Then, the main control unit 220 detects an operation position (coordinates) on the display panel 202 based on the received detection signal.

As shown in FIG. 16, the display panel 202 and the operation panel 203 of the smart phone 200 are integrated and accumulated to form the display input unit 204, in which the operation panel 203 is arranged to completely cover the display panel 202.

In a case where such an arrangement is employed, the operation panel 203 may have a function of detecting a user operation in a region out of the display panel 202. In other words, the operation panel 203 may include a detection region with respect to a portion that overlaps the display panel 202 (hereinafter, referred to as a display region), and a detection region with respect to an outer edge portion that does not overlap the display panel 202 (hereinafter, referred to as a non-display region).

The size of the display region and the size of the display panel 202 may be completely the same, but it is not essential that both of the sizes are the same. Further, the operation panel 203 may include two sensitive regions of an outer edge portion and an inner portion other than the outer edge portion. Further, the width of the outer edge portion is appropriately set according to the size of the housing 201, or the like.

Furthermore, as a position detecting method employed in the operation panel 203, any one of a matrix switch type, a resistive film type, a surface acoustic wave type, an infrared type, an inductive coupling type, an electromagnetic capacitance type, or the like may be employed.

The communication unit 211 includes the speaker 205 and the microphone 206, and converts user's voice input through the microphone 206 into voice data capable of being processed by the main control unit 220 and outputs the result to the main control unit 220, or decodes voice data received by the wireless communication unit 210 or the external input/output unit 213 and outputs the result through the speaker 205.

Further, as shown in FIG. 16, for example, the speaker 205 may be placed on the same surface as the surface where the display input unit 204 is provided, and the microphone 206 may be placed on a side surface of the housing 201.

The operation unit 207 is a hardware key using a key switch or the like, and receives a command from the user. For example, as shown in FIG. 17, the operation unit 207 is a push button switch that is placed on a side surface of the housing 201 of the smart phone 200, is turned on when being pressed by a finger or the like, and is turned off by a restoring force of a spring or the like when the finger is separated.

The storage unit 212 stores a control program or control data of the main control unit 220, application software, address data in which a name, a telephone number, and the like of a communication partner are associated with each other, data on transmitted or received e-mail, Web data downloaded by a Web browser, or data on downloaded content, and temporarily stores streaming data or the like.

Further, the storage unit 212 includes an internal storage section 217 built in the smart phone, and an external storage section 218 provided with an attachable and detachable memory slot. Each of the respective internal storage section 217 and the external storage section 218 that form the storage unit 212 is realized using a storage medium such as a flash memory type, a hard disk type, a multimedia card micro type memory, a card type memory (for example, MicroSD (registered trademark) memory or the like), a random access memory (RAM), a read only memory (ROM), or the like.

The external input/output unit 213 serves as an interface with respect to all types of external devices to be connected to the smart phone 200, and is configured to be directly or indirectly connected to other external devices through communication or the like (for example, universal serial bus (USB), IEEE1394, or the like) or a network (for example, Internet, wireless local area network (LAN), Bluetooth (registered trademark), radio frequency identification (RFID), Infrared Data Association (IrDA, registered trademark), Ultra Wideband (UWB, registered trademark), Zig-Bee (registered trademark), or the like).

As an external device to be connected to the smart phone 200, for example, a wired or wireless headset, a wired or wireless external charger, a wired or wireless data port, a memory card, a subscriber identity module (SIM) card or a user identity module (UIM) card connected through a card socket, an external audio/video device connected through an audio/video input/output (I/O) terminal, an external audio/video device connected in a wireless manner, a smart phone connected in a wired or wireless manner, a personal computer connected in a wired or wireless manner, a PDA connected in a wired or wireless manner, an earphone, or the like is used.

The external input/output unit 213 may be configured to transmit data transmitted and received from the external device to respective components in the smart phone 200, or to transmit data in the smart phone 200 to the external device.

The GPS receiving unit 214 receives GPS signals transmitted from GPS satellites ST1 to STn according to a command of the main control unit 220, executes a positioning operation process based on the plural received GPS signals, and detects the position of the smart phone 200 including latitude, longitude and altitude.

When position information can be acquired from the wireless communication unit 210 or the external input/output unit 213 (for example, wireless LAN), the GPS receiving unit 214 can also detect the position using the position information.

The motion sensor unit 215 includes a triaxial acceleration sensor or the like, for example, and detects a physical movement of the smart phone 200 according to a command of the main control unit 220.

By detecting the physical movement of the smart phone 200, a direction and an acceleration where the smart phone 200 moves are detected. The detection result is output to the main control unit 220.

The power source unit 216 supplies power to be accumulated in a battery (not shown) to respective units of the smart phone 200 according to a command of the main control unit 220.

The main control unit 220 includes a micro processor, and is operated according to a control program or control data stored in the storage unit 212 to generally control the respective units of the smart phone 200.

Further, the main control unit 220 has a mobile communication control function for controlling respective units of a communication system and an application processing function in order to perform voice communication or data communication through the wireless communication unit 210.

The application processing function is realized as the main control unit 220 is operated according to application software stored in the storage unit 212. As the application processing function, for example, an infrared communication function for controlling the external input/output unit 213 to perform data communication with an opposing device, an e-mail function for performing transmission and reception of e-mail, a Web browsing function for browsing Web pages, or the like is used.

Further, the main control unit 220 has an image processing function, for example, for displaying an image on the display input unit 204 based on image data (data on a still image or a moving image) such as received data or downloaded streaming data. The image processing function refers to a function for decoding the image data, performing image processing with respect to the decoded image data, and displaying an image on the display input unit 204, by the main control unit 220.

In addition, the main control unit 220 executes a display control with respect to the display panel 202, and an operation detection control for detecting a user operation through the operation unit 207 or the operation panel 203. By executing the display control, the main control unit 220 displays an icon for starting up application software or a software key such as a scroll bar, or displays a window for creating an e-mail.

The scroll bar refers to a soft key for receiving, with respect to an image which cannot be accommodated in a display region of the display panel 202, a command for movement of a display portion of the image.

Further, by execution of the operation detection control, the main control unit 220 detects a user operation through the operation unit 207, receives an operation with respect to an icon or an input of a character string with respect to an input section of the window through the operation panel 203, or receives a scroll request of a display image through the scroll bar.

Furthermore, by execution of the operation detection control, the main control unit 220 includes a touch panel control function for determining whether an operation position with respect to the operation panel 203 is a portion (display region) that overlaps the display panel 202 or an outer edge portion (non-display region) that does not overlap the display panel 202, and controlling a sensitive region of the operation panel 203 and a display position of a soft key.

The main control unit 220 may detect a gesture operation with respect to the operation panel 203, and may execute a predetermined function according to the detected gesture operation. The gesture operation does not refer to a typical simple operation, but refers to an operation of drawing a locus using a finger or the like, an operation of simultaneously designating plural positions, or an operation of drawing a locus with respect to at least one of plural positions by combination of the above operations.

The camera unit 208 includes a configuration other than the external memory control unit 20, the recording medium 21, the display control unit 22, the display unit 23, the operation unit 14 in the digital camera shown in FIG. 1.

The captured image data generated by the camera unit 208 may be stored in the storage unit 212, or may be output through the external input/output unit 213 or the wireless communication unit 210.

In the smart phone 200 shown in FIG. 16, the camera unit 208 is placed on the same surface as that of the display input unit 204, but the mounting position of the camera unit 208 is not limited thereto, and may be a rear surface of the display input unit 204.

Further, the camera unit 208 may be used for various functions of the smart phone 200. For example, an image acquired by the camera unit 208 may be displayed on the display panel 202, or the image of the camera unit 208 may be used as one of operation inputs through the operation panel 203.

Further, when detecting the position using the GPS receiving unit 214, it is possible to detect the position with reference to the image from the camera unit 208. In addition, it is possible to determine an optical axis direction or a current usage environment of the camera unit 208 of the smart phone 200 without using the triaxial acceleration sensor or by using the triaxial acceleration sensor together with reference to the image from the camera unit 208. Further, the image from the camera unit 208 may be used in the application software.

Furthermore, position information acquired by the GPS receiving unit 214, voice information (which may be text information obtained by performing voice text conversion by the main control unit or the like) acquired by the microphone 206, posture information acquired by the motion sensor unit 215, or the like may be added to the image data on a still image or a moving image, and the result may be recorded in the storage unit 212, or may be output through the external input/output unit 213 or the wireless communication unit 210.

As described above, this specification discloses the following content.

(1) A focusing control device comprising: a sensor that has a pair of a first signal detection unit that receives one of a pair of beams passed through different parts disposed in one direction in a pupil region of an imaging optical system including a focus lens and detects a signal depending on an intensity of received light and a second signal detection unit that receives the other of the pair of beams and detects a signal depending on an intensity of received light, in which a plurality of the pairs that are arranged in the one direction form a pair line and a plurality of the pair lines are arranged in a direction orthogonal to the one direction; an addition correlation operation unit that performs a correlation operation between a first signal group obtained by adding up detection signals detected by the first signal detection units of which positions in the one direction are the same, included in the plurality of pair lines, and a second signal group obtained by adding up detection signals detected by the second signal detection units of which positions in the one direction are the same, included in the plurality of pair lines; a non-addition correlation operation unit that performs, for each of the plurality of pair lines, a correlation operation between a detection signal group detected by the first signal detection units included in the pair line and a detection signal group detected by the second signal detection units included in the pair line; a selection unit that calculates a matching rate between first result information of the correlation operation performed by the addition correlation operation unit and second result information of the correlation operation performed by the non-addition correlation operation unit, and selects any one of the first result information or the second result information on the basis of the matching rate; and a lens driving section that drives the focus lens on the basis of the result information selected by the selection unit.

(2) The focusing control device according to (1), wherein the selection unit selects the first result information in a case where the matching rate exceeds a matching threshold value, and selects the second result information in a case where the matching rate is equal to or smaller than the matching threshold value.

(3) The focusing control device according to (2), wherein the selection unit variably controls the matching threshold value.

(4) The focusing control device according to (3), wherein the selection unit sets the matching threshold value to be smaller as a brightness of a subject imaged through the imaging optical system is darker.

(5) The focusing control device according to (3), wherein the selection unit sets the matching threshold value to be smaller as an imaging sensitivity of an imaging device that images a subject through the imaging optical system is higher.

(6) The focusing control device according to any one of (1) to (5), wherein the first result information is information indicating a relationship between a shift amount in a case where the first signal group and the second signal group shift in the one direction by a predetermined shift amount and a correlation value of the first signal group and the second signal group in the shift amount, the second result information is information obtained by adding up or averaging information for each of the plurality of pair lines indicating a relationship between a shift amount in a case where the two detection signal groups shift in the one direction by a predetermined shift amount and a correlation value of the two detection signal groups in the shift amount, and the matching rate is an index indicating a similarity between a shape of a graph indicated by the first result information and a shape of a graph indicated by the second result information.

(7) The focusing control device according to any one of (1) to (6), further comprising: a reliability determination unit that determines a reliability of the first result information, wherein the selection unit selects any one of the first result information or the second result information on the basis of the matching rate in a case where the reliability is equal to or smaller than a reliability threshold value, and selects the first result information in a case where the reliability exceeds the reliability threshold value.

(8) The focusing control device according to any one of (1) to (6), further comprising: a defocus amount calculation unit that calculates a defocus amount on the basis of the first result information, wherein the selection unit selects any one of the first result information or the second result information on the basis of the matching rate in a case where the defocus amount is equal to or smaller than a defocus threshold value, and selects the first result information in a case where the defocus amount exceeds the defocus threshold value.

(9) An imaging device comprising: the focusing control device according to any one of (1) to (8); and an imaging element that images a subject through the imaging optical system including the focus lens.

(10) A lens device comprising: the focusing control device according to any one of (1) to (8); and the imaging optical system.

(11) A focusing control method for controlling a position of a focus lens, using a sensor that has a pair of a first signal detection unit that receives one of a pair of beams passed through different parts disposed in one direction in a pupil region of an imaging optical system including the focus lens and detects a signal depending on an intensity of received light and a second signal detection unit that receives the other of the pair of beams and detects a signal depending on an intensity of received light, in which a plurality of the pairs that are arranged in the one direction form a pair line and a plurality of the pair lines are arranged in a direction orthogonal to the one direction, the method comprising: an addition correlation operation step of performing a correlation operation between a first signal group obtained by adding up detection signals detected by the first signal detection units of which positions in the one direction are the same, included in the plurality of pair lines, and a second signal group obtained by adding up detection signals detected by the second signal detection units of which positions in the one direction are the same, included in the plurality of pair lines; a non-addition correlation operation step of performing, for each of the plurality of pair lines, a correlation operation between a detection signal group detected by the first signal detection units included in the pair line and a detection signal group detected by the second signal detection units included in the pair line; a selection step of calculating a matching rate between first result information of the correlation operation performed in the addition correlation operation step and second result information of the correlation operation performed in the non-addition correlation operation step, and selecting any one of the first result information or the second result information on the basis of the matching rate; and a lens drive step of driving the focus lens on the basis of the result information selected in the selection step.

(12) The focusing control method according to (11), wherein in the selection step, in a case where the matching rate exceeds a matching threshold value, the first result information is selected, and in a case where the matching rate is equal to or smaller than the matching threshold value, the second result information is selected.

(13) The focusing control method according to (12), wherein in the selection step, the matching threshold value is variably controlled.

(14) The focusing control method according to (13), wherein in the selection step, the matching threshold value is set to be smaller as a brightness of a subject imaged through the imaging optical system is darker.

(15) The focusing control method according to (13), wherein in the selection step, the matching threshold value is set to be smaller as an imaging sensitivity of an imaging device that images a subject through the imaging optical system is higher.

(16) The focusing control method according to any one of (11) to (15), wherein the first result information is information indicating a relationship between a shift amount in a case where the first signal group and the second signal group shift in the one direction by a predetermined shift amount and a correlation value of the first signal group and the second signal group in the shift amount, the second result information is information obtained by adding up or averaging information for each of the plurality of pair lines indicating a relationship between a shift amount in a case where the two detection signal groups shift in the one direction by a predetermined shift amount and a correlation value of the two detection signal groups in the shift amount, and the matching rate is an index indicating a similarity between a shape of a graph indicated by the first result information and a shape of a graph indicated by the second result information.

(17) The focusing control method according to any one of (11) to (16), further comprising: a reliability determination step of determining a reliability of the first result information, wherein in the selection step, in a case where the reliability is equal to or smaller than a reliability threshold value, any one of the first result information or the second result information is selected on the basis of the matching rate, and in a case where the reliability exceeds the reliability threshold value, the first result information is selected.

(18) The focusing control method according to any one of (11) to (16), further comprising: a defocus amount calculation step of calculating a defocus amount on the basis of the first result information, wherein in the selection step, in a case where the defocus amount is equal to or smaller than a defocus threshold value, any one of the first result information or the second result information is selected on the basis of the matching rate, and in a case where the defocus amount exceeds the defocus threshold value, the first result information is selected.

(19) A focusing control program that causes a computer to execute a focusing control method for controlling a position of a focus lens, using a sensor that has a pair of a first signal detection unit that receives one of a pair of beams passed through different parts disposed in one direction in a pupil region of an imaging optical system including the focus lens and detects a signal depending on an intensity of received light and a second signal detection unit that receives the other of the pair of beams and detects a signal depending on an intensity of received light, in which a plurality of the pairs that are arranged in the one direction form a pair line and a plurality of the pair lines are arranged in a direction orthogonal to the one direction, the method comprising: an addition correlation operation step of performing a correlation operation between a first signal group obtained by adding up detection signals detected by the first signal detection units of which positions in the one direction are the same, included in the plurality of pair lines, and a second signal group obtained by adding up detection signals detected by the second signal detection units of which positions in the one direction are the same, included in the plurality of pair lines; a non-addition correlation operation step of performing, for each of the plurality of pair lines, a correlation operation between a detection signal group detected by the first signal detection units included in the pair line and a detection signal group detected by the second signal detection units included in the pair line; a selection step of calculating a matching rate between first result information of the correlation operation performed in the addition correlation operation step and second result information of the correlation operation performed in the non-addition correlation operation step, and selecting any one of the first result information or the second result information on the basis of the matching rate; and a lens drive step of driving the focus lens on the basis of the result information selected in the selection step.

According to the present invention, it is possible to provide a focusing control device, a lens device, an imaging device, a focusing control method, and a focusing control program capable of calculating a phase difference suitable for a subject to enhance the accuracy of a focusing control.

As described above, the invention has been described with reference to specific embodiments, but the invention is not limited to the embodiments, and various modifications may be made in a range without departing from the concept of the disclosed invention.

Priority is claimed to Japanese Patent Application No. 2016-077550, filed Apr. 7, 2016, the entire content of which is incorporated herein by reference.

What is claimed is:

1. A focusing control device comprising:
a sensor that has a plurality of pairs of signal detection units, wherein each of the plurality of pairs includes a first signal detection unit and a second signal detection unit, the first signal detection unit is configured to receive one of a pair of beams passed through different parts of an imaging optical system including a focus lens and detects a signal depending on an intensity of received light, the second signal detection unit is configured to receive other one of the pair of beams and detects a signal depending on an intensity of received light, and the different parts are disposed in one direction in a pupil region of the imaging optical system, wherein the sensor has a plurality of lines each comprising a portion of the plurality of pairs that are arranged in the one direction, and the plurality of lines are arranged in a direction orthogonal to the one direction;
an addition correlation operation unit that performs a correlation operation between a first signal group obtained by adding up detection signals detected by a plurality of first signal detection units, of which positions in the one direction are same, included in the plurality of lines, and a second signal group obtained by adding up detection signals detected by a plurality of second signal detection units, of which positions in the one direction are same, included in the plurality of lines;
a non-addition correlation operation unit that performs, for each of the plurality of lines, a correlation operation between a detection signal group detected by the first signal detection units included in the line and a detection signal group detected by the second signal detection units included in the line;
a selection unit that calculates a matching rate between first result information of the correlation operation performed by the addition correlation operation unit and second result information of the correlation operation performed by the non-addition correlation operation unit, and selects one of the first result information and the second result information based on the matching rate; and
a lens driving section that drives the focus lens based on the result information selected by the selection unit.

2. The focusing control device according to claim 1, wherein the selection unit selects the first result information in a case where the matching rate exceeds a matching threshold value, and selects the second result information in a case where the matching rate is equal to or smaller than the matching threshold value.

3. The focusing control device according to claim 2, wherein the selection unit variably controls the matching threshold value.

4. The focusing control device according to claim 3, wherein the selection unit sets the matching threshold value to be smaller as a brightness of a subject imaged through the imaging optical system is darker.

5. The focusing control device according to claim 3, wherein the selection unit sets the matching threshold value to be smaller as an imaging sensitivity of an imaging device that images a subject through the imaging optical system is higher.

6. The focusing control device according to claim 1, wherein the first result information is information indicating a relationship between a shift amount obtained in response to the first signal group and the second signal group being shifted in the one direction by a predetermined shift amount and a correlation value of the first signal group and the second signal group in the shift amount,
the second result information is information obtained by adding up or averaging information for each of the plurality of lines indicating a relationship between a shift amount obtained in response to the two detection signal groups being shifted in the one direction by a predetermined shift amount and a correlation value of the two detection signal groups in the shift amount, and
the matching rate is an index indicating a similarity between a shape of a graph indicated by the first result information and a shape of a graph indicated by the second result information.

7. The focusing control device according to claim 1, further comprising:
a reliability determination unit that determines a reliability of the first result information,
wherein the selection unit selects one of the first result information and the second result information based on the matching rate in a case where the reliability is equal to or smaller than a reliability threshold value, and selects the first result information in a case where the reliability exceeds the reliability threshold value.

8. The focusing control device according to claim 1, further comprising:
a defocus amount calculation unit that calculates a defocus amount based on the first result information,
wherein the selection unit selects one of the first result information and the second result information based on the matching rate in a case where the defocus amount is equal to or smaller than a defocus threshold value, and selects the first result information in a case where the defocus amount exceeds the defocus threshold value.

9. An imaging device comprising:
the focusing control device according to claim 1; and
an imaging element that images a subject through the imaging optical system including the focus lens.

10. A lens device comprising:
the focusing control device according to claim 1; and
the imaging optical system.

11. The focusing control device according to claim 1, wherein the first signal detection unit and the second signal detection unit included in the each of the plurality of pairs respectively have a light-shielding portion covered by a light shielding film and a light-receiving portion defined by an opening in the light shielding film, and an arrangement of the light-shielding portion and the light-receiving portion in the first signal detection unit is different from an arrangement of the light-shielding portion and the light-receiving portion in the second signal detection unit.

12. A focusing control method for controlling a position of a focus lens, using a sensor that has a plurality of pairs of signal detection units, wherein each of the plurality of pairs includes a first signal detection unit and a second signal detection unit, the first signal detection unit is configured to receive one of a pair of beams passed through different parts of an imaging optical system including the focus lens and detects a signal depending on an intensity of received light, the second signal detection unit is configured to receive other one of the pair of beams and detects a signal depending on an intensity of received light, and the different parts are disposed in one direction in a pupil region of the imaging optical system, wherein the sensor has a plurality of lines each comprising a portion of the plurality of pairs that are arranged in the one direction, and the plurality of lines are arranged in a direction orthogonal to the one direction, the method comprising:

an addition correlation operation step of performing a correlation operation between a first signal group obtained by adding up detection signals detected by a plurality of first signal detection units, of which positions in the one direction are same, included in the plurality of lines, and a second signal group obtained by adding up detection signals detected by a plurality of second signal detection units, of which positions in the one direction are same, included in the plurality of lines;

a non-addition correlation operation step of performing, for each of the plurality of lines, a correlation operation between a detection signal group detected by the first signal detection units included in the line and a detection signal group detected by the second signal detection units included in the line;

a selection step of calculating a matching rate between first result information of the correlation operation performed in the addition correlation operation step and second result information of the correlation operation performed in the non-addition correlation operation step, and selecting one of the first result information and the second result information based on the matching rate; and a lens drive step of driving the focus lens based on the result information selected in the selection step.

13. The focusing control method according to claim 12, wherein, in the selection step, in a case where the matching rate exceeds a matching threshold value, the first result information is selected, and in a case where the matching rate is equal to or smaller than the matching threshold value, the second result information is selected.

14. The focusing control method according to claim 13, wherein, in the selection step, the matching threshold value is variably controlled.

15. The focusing control method according to claim 14, wherein, in the selection step, the matching threshold value is set to be smaller as a brightness of a subject imaged through the imaging optical system is darker.

16. The focusing control method according to claim 14, wherein, in the selection step, the matching threshold value is set to be smaller as an imaging sensitivity of an imaging device that images a subject through the imaging optical system is higher.

17. The focusing control method according to claim 12, wherein the first result information is information indicating a relationship between a shift amount obtained in response to the first signal group and the second signal group being shifted in the one direction by a predetermined shift amount and a correlation value of the first signal group and the second signal group in the shift amount, the second result information is information obtained by adding up or averaging information for each of the plurality of lines indicating a relationship between a shift amount obtained in response to the two detection signal groups being shifted in the one direction by a predetermined shift amount and a correlation value of the two detection signal groups in the shift amount, and the matching rate is an index indicating a similarity between a shape of a graph indicated by the first result information and a shape of a graph indicated by the second result information.

18. The focusing control method according to claim 12, further comprising:

a reliability determination step of determining a reliability of the first result information, wherein, in the selection step, in a case where the reliability is equal to or smaller than a reliability threshold value, one of the first result information and the second result information is selected based on the matching rate, and in a case where the reliability exceeds the reliability threshold value, the first result information is selected.

19. The focusing control method according to claim 12, further comprising:

a defocus amount calculation step of calculating a defocus amount based on the first result information, wherein, in the selection step, in a case where the defocus amount is equal to or smaller than a defocus threshold value, one of the first result information and the second result information is selected based on the matching rate, and in a case where the defocus amount exceeds the defocus threshold value, the first result information is selected.

20. A computer readable medium storing a focusing control program that causes a computer to execute a focusing control method for controlling a position of a focus lens, using a sensor that has a plurality of pairs of signal detection units, wherein each of the plurality of pairs includes a first signal detection unit and a second signal detection unit, the first signal detection unit is configured to receive one of a pair of beams passed through different parts of an imaging optical system including a focus lens and detects a signal depending on an intensity of received light, the second signal detection unit is configured to receive other one of the pair of beams and detects a signal depending on an intensity of received light, and the different parts are disposed in one direction in a pupil region of the imaging optical system, wherein the sensor has a plurality of lines each comprising a portion of the plurality of pairs that are arranged in the one direction, and the plurality of lines are arranged in a direction orthogonal to the one direction, the method comprising:

an addition correlation operation step of performing a correlation operation between a first signal group obtained by adding up detection signals detected by a plurality of first signal detection units, of which positions in the one direction are same, included in the plurality of lines, and a second signal group obtained by adding up detection signals detected by a plurality of second signal detection units, of which positions in the one direction are same, included in the plurality of lines;

a non-addition correlation operation step of performing, for each of the plurality of lines, a correlation operation between a detection signal group detected by the first signal detection units included in the line and a detection signal group detected by the second signal detection units included in the line;

a selection step of calculating a matching rate between first result information of the correlation operation performed in the addition correlation operation step and second result information of the correlation operation performed in the non-addition correlation operation step, and selecting one of the first result information and the second result information based on the matching rate; and a lens drive step of driving the focus lens based on the result information selected in the selection step.

* * * * *